US012354603B1

(12) United States Patent
Lee et al.

(10) Patent No.: US 12,354,603 B1
(45) Date of Patent: Jul. 8, 2025

(54) NATURAL LANGUAGE RESPONSE GENERATION

(71) Applicant: Amazon Technologies, Inc., Seattle, WA (US)

(72) Inventors: Sungjin Lee, Woodinville, WA (US); Di Jin, Santa Clara, CA (US); Dilek Hakkani-Tur, Los Altos, CA (US); Yang Liu, Los Altos, CA (US)

(73) Assignee: Amazon Technologies, Inc., Seattle, WA (US)

(*) Notice: Subject to any disclaimer, the term of this patent is extended or adjusted under 35 U.S.C. 154(b) by 285 days.

(21) Appl. No.: 18/193,855

(22) Filed: Mar. 31, 2023

(51) Int. Cl.
| | |
|---|---|
| *G10L 15/22* | (2006.01) |
| *G10L 15/06* | (2013.01) |
| *G10L 15/18* | (2013.01) |
| *G10L 15/30* | (2013.01) |

(52) U.S. Cl.
CPC ........ *G10L 15/22* (2013.01); *G10L 15/1815* (2013.01); *G10L 15/30* (2013.01); *G10L 15/063* (2013.01); *G10L 2015/227* (2013.01)

(58) Field of Classification Search
USPC ..................................................... 704/1–504
See application file for complete search history.

(56) References Cited

U.S. PATENT DOCUMENTS

| | | | | |
|---|---|---|---|---|
| 10,585,991 | B2* | 3/2020 | Miller | G06F 40/35 |
| 11,809,829 | B2* | 11/2023 | Miller | G06Q 10/06 |
| 11,978,437 | B1* | 5/2024 | Thattai | G10L 13/027 |
| 12,045,288 | B1* | 7/2024 | Barut | G06F 16/532 |
| 12,112,752 | B1* | 10/2024 | Gupta | G10L 15/08 |
| 2014/0316764 | A1* | 10/2014 | Ayan | H04M 3/4936 704/9 |
| 2019/0005021 | A1* | 1/2019 | Miller | G10L 15/22 |
| 2020/0394366 | A1* | 12/2020 | Miller | G06F 40/35 |
| 2021/0398524 | A1* | 12/2021 | Gao | G06F 40/35 |

* cited by examiner

*Primary Examiner* — Marcus T Riley
(74) *Attorney, Agent, or Firm* — Pierce Atwood LLP

(57) ABSTRACT

Techniques for generating a natural language response to a user input of a dialog are described. A system receives a natural language user input of a dialog and determines dialog history data including a previous natural language user input of the dialog. Based on the first natural language user input and the dialog history data, the system generates at least a first question associated with the natural language user input. Based on the first natural language user input and the dialog history data, the system generates at least a first answer to the at least first question. Using the dialog history data, the first natural language question, and the first natural language answer, the system generates an output responsive to the natural language user input.

20 Claims, 9 Drawing Sheets

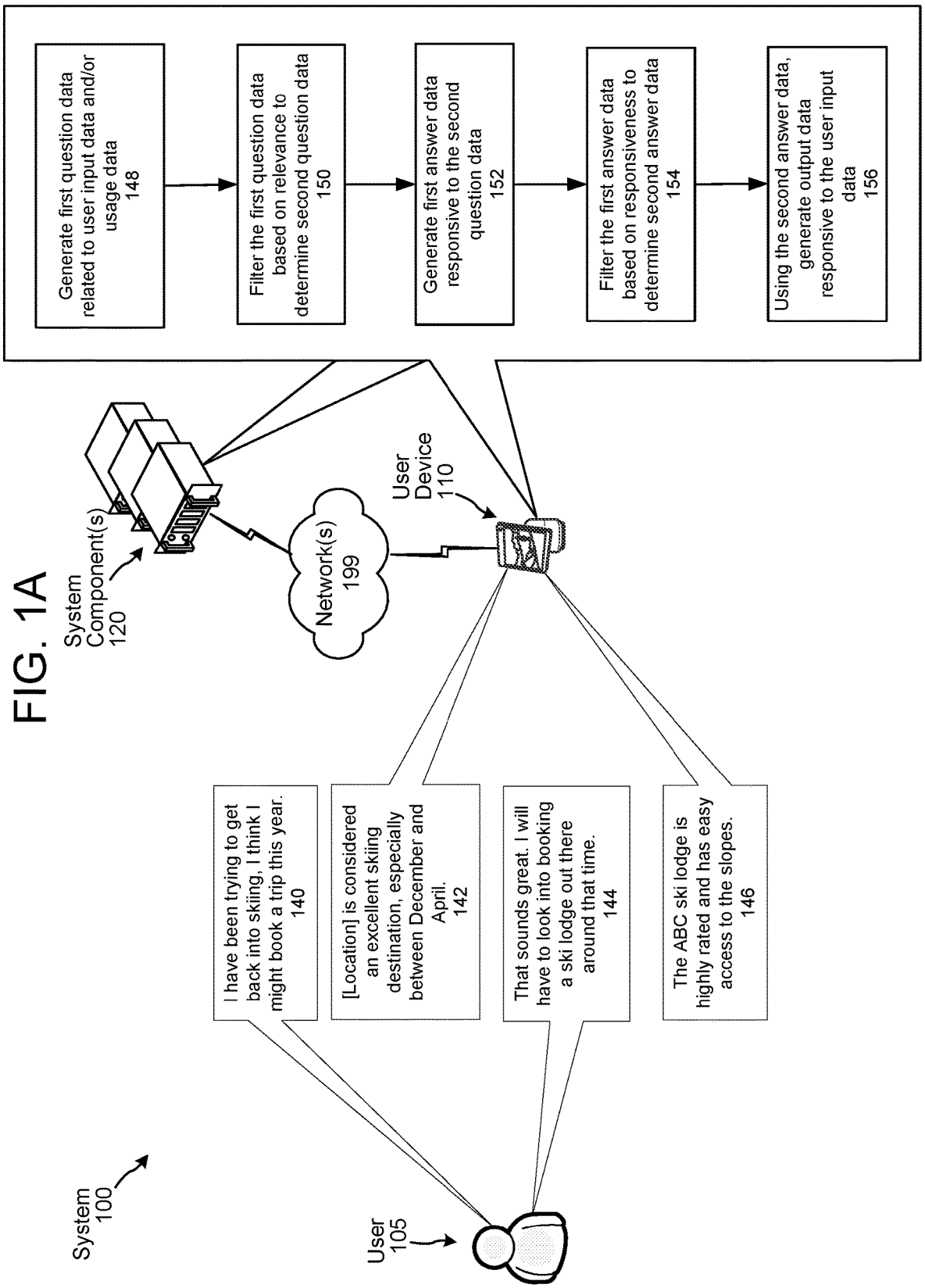

NATURAL LANGUAGE RESPONSE GENERATION

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating an example user-system dialog and example processing performed to generate responses to the user inputs of the dialog, according to embodiments of the present disclosure.

DETAILED DESCRIPTION

Figure 1B:
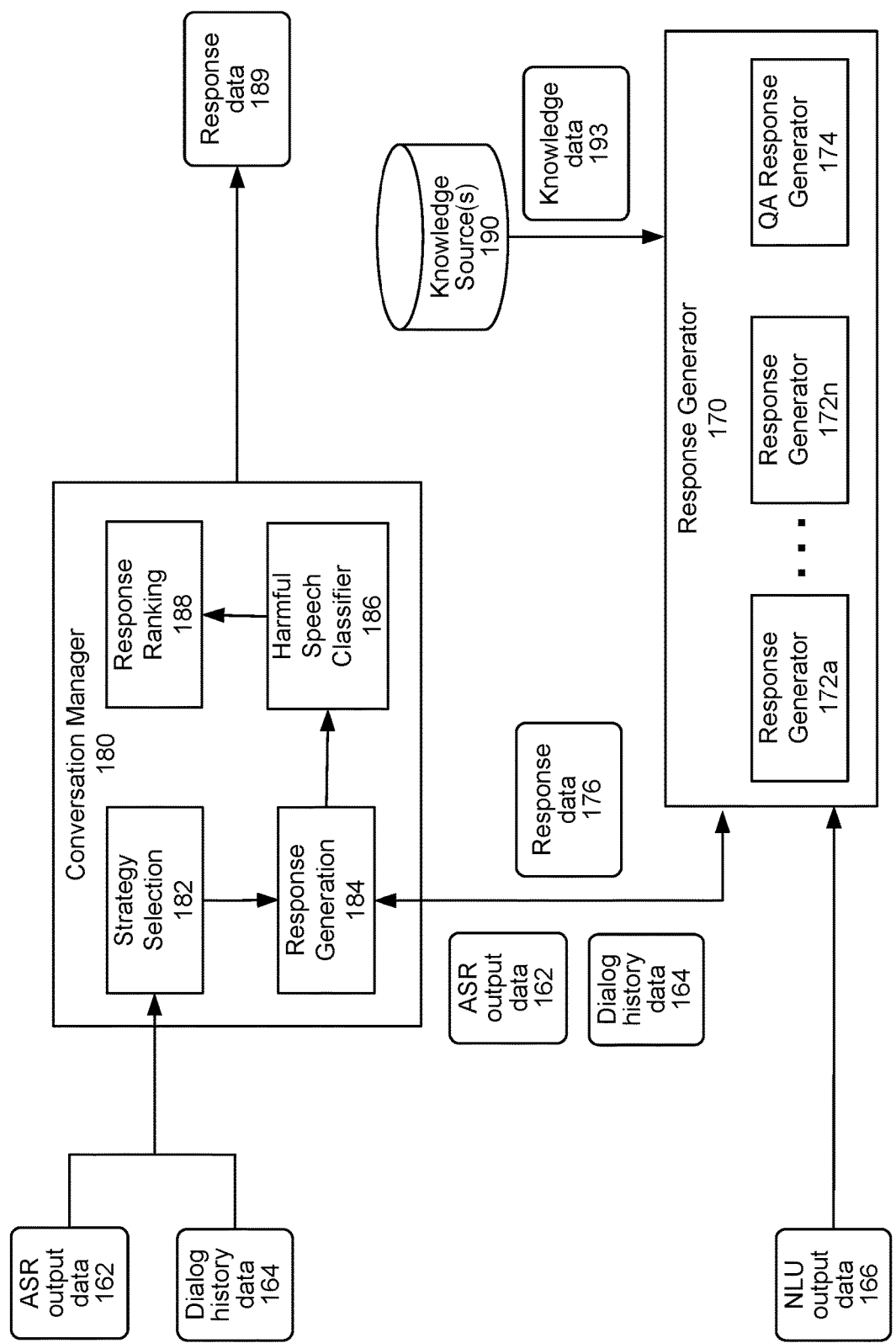
FIG. 1B is a conceptual diagram illustrating example components and processing of a system for generating a natural language response to a user input, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Natural language generation (NLG) is a field of artificial intelligence concerned with automatically transforming data into natural language (e.g., English) content. Text-to-speech (TTS) is a field of computer science concerning transforming textual and/or other data, such as NLG output data, into audio data that is synthesized to resemble human speech.

The present disclosure provides techniques for generating and outputting a coherent and engaging response to a user input of a user-system dialog corresponding to various domains and/or topics, where the natural language response is generated based on system-generated questions associated with the user input and system-generated answers to the questions. For example, in response to the natural language user input "I have been trying to get back into skiing, I think I might book a trip this year," the system may determine one or more questions related to the natural language user input, such as "what is skiing," "what are the best skiing locations," "what is the best time to book a skiing trip," or the like. The system may filter the one or more questions based on a relevance between the one or more questions and the natural language user input to determine a subset of the one or more questions. The system may determine one or more answers to the subset of questions, such as "skiing is the use of skis to glide on snow," "Colorado is widely considered one of the best skiing locations in the United States," "Skiing is a thrilling experience. Many people remark that they enjoy the high-speed nature of the sport," "the best time to go skiing is between December and April," or the like. The system may filter the one or more answers based on a relevance between the one or more answers and the natural language user input and a confidence associated with the answer(s) to determine a subset of the one or more answers. The system may use the natural language user input, the subset of questions, and the subset of answers to determine and output a response corresponding to "Great idea! Do you have any particular place in mind for the trip? I heard skiing in Colorado is an excellent destination, especially between December and April." For further example, in response to the natural language user input "I am looking for new music. I really like [Artist name1], do you have any suggestions," the system may process as described above to determine to output a response corresponding to "[Artist Name1] is fantastic! Their last single, [song name], topped the charts. You should also check out [Artist Name2] and let me know what you think." For further example, in response to the natural language user input "I didn't really care for the [Movie Name1] remake, the original was way better," the system may process as described above to determine to output a response corresponding to "Lots of people are saying that. They are also saying it wasn't [Actor's Name]'s best performance, but others who said that still like the [Movie Name2] remake. Have you seen it?"

As used herein, a "dialog" may refer to multiple related user inputs and system outputs (e.g., through one or more user devices) between the system and the user. Thus, the data associated with a dialog may be associated with a same dialog identifier, which may be used by components of the system to associate information across the dialog. Subsequent user inputs of the same dialog may or may not start with the user speaking a wakeword, the user looking at the device, or the user simply talking to the system with the system having technology to determine when spoken input is system-directed. Each natural language input may be associated with a different natural language input identifier, and each natural language input identifier may be associated with a corresponding dialog identifier. Further, other non-natural language inputs (e.g., image data, touch data, button presses, non-language sounds, etc.) may relate to a particular dialog depending on the context of the inputs. For example, a user may open a dialog with the system to request a food delivery in a spoken utterance and the system may respond by displaying images of food available for order and the user may gesture a response (e.g., point to an item on the screen or give a thumbs-up that is represented by image data and understood by the machine using computer vision) or may touch the screen on the desired item to be selected. Non-speech inputs (e.g., air gestures, screen touches, knocking/tapping sounds, etc.) may be part of the dialog and the data associated therewith may be associated with the dialog identifier of the dialog. In some embodiments, the system determination data determined during a dialog, as well as knowledge data (e.g., personalized knowledge data, the factual knowledge data, and/or the general knowledge data) and context data may be associated with the dialog identifier. A dialog may also occur across devices and across time. For example, a user may ask the system about a topic while in one room then move to another room and sometime later continue to engage with the system (interacting with a different device) about the same topic. The system may determine the second user input relates to the same topic as the first user input and thus may associate the two as being part of the same dialog.

A dialog may be goal-oriented, where the user asks the system to perform some action in response to the user's input. A dialog may also not be goal-oriented, such as where the system conducts a freeform dialog with the system (e.g., related to a particular topic, etc.). This natural language inputs can be with a system sometimes referred to as a chatbot. A dialog may also be a combination of goal-oriented and non-goal-oriented exchanges.

The system may receive a user input from a user. If the user input includes input audio, the system may perform ASR processing using the input audio to generate an ASR output representing a transcript of the user input. The system may further perform NLU processing using the ASR output to generate an NLU output including an intent corresponding to the user input. If the user input includes input text (or tokens), the system may perform NLU processing using the input text (or tokens) to generate the NLU output.

The system may determine the user input is part of a user-system dialog and may determine a dialog history of the dialog including one or more previous user inputs and/or one or more previous system-generated responses of the dialog. Based on determining the user input is part of the dialog, the system may process the ASR output, NLU output, and/or dialog history using one or more response generators to determine a response to the user input.

For example, the system may use a response generator to determine one or more questions associated with the user input and/or the dialog history (e.g., associated with an entity included in the user input and/or the dialog history). The system may determine a subset of the determined questions based on their relevance to the user input and/or the dialog history. The system may process the subset of the questions to generate one or more answers responsive to the subset of the questions. The system may process the subset of the questions and the one or more answers to determine a subset of answers based on their relevance to the user input and/or the dialog history and/or a confidence associated with the one or more answers. Based on the subset of the questions, the subset of the answers, the user input, and/or the dialog history, the system may determine a response to the user input.

The system may further use one or more additional response generators to determine one or more additional responses to the user input, based on the ASR output, the NLU output, and the dialog history. The system may determine a subset of the responses based on their appropriateness for output (e.g., based on whether they include sensitive information (profanity, confidential information, financial information, medical information, etc.) and may rank the subset of responses based on a likelihood that presentation of a response will result in a subsequent user input related to the response. The system may output a top-ranked response of the subset of responses.

A system of the present disclosure may receive input audio corresponding to a first spoken input of a dialog. The system may determine a dialog history including a first natural language representation of the first spoken input, and a second natural language representation of a previous spoken input of the dialog. Based on the dialog history, the system may generate a first plurality of natural language questions corresponding to an entity represented in the dialog history, the first plurality of natural language questions including a first natural language question and a second natural language question. After determining the first plurality of natural language questions, the system may generate a first natural language answer responsive to the first natural language question and generate a second natural language answer responsive to the second natural language question. Based on the dialog history, the first natural language question, the second natural language question, the first natural language answer, and the second natural language answer, the system may determine a first likelihood that presentation of a first output associated with the first natural language answer will result in a satisfactory user experience, and a second likelihood that presentation of a second output associated with the second natural language answer will result in the satisfactory user experience. Based on the first likelihood and the second likelihood, the system may determine to generate a first output responsive to the first spoken input using the first natural language answer instead of the second natural language answer. Using the dialog history, the first natural language question, and the first natural language answer, the system may generate the first output and cause presentation of the first output.

In some embodiments, the first plurality of natural language questions may further include a third natural language question, and the system may further process, using a first trained machine learning (ML) component, the dialog history to generate the first plurality of natural language questions. The system may process, using a second trained ML component, (1) the dialog history and the first natural language question to determine the first natural language question is semantically similar to the dialog history; and (2) the dialog history and the second natural language question to determine the second natural language question is semantically similar to the dialog history. Based on determining the first natural language question is semantically similar to the dialog history and determining the second natural language question is semantically similar to the dialog history, the system may determine a second plurality of natural language questions, the second plurality of natural language questions being a subset of the first plurality of natural language questions and including the first natural language question and the second natural language question. The system may process, using a third trained ML component configured to use a search engine to generate a natural language answer responsive to a natural language question the dialog history and the second plurality of natural language questions to generate the first natural language answer and the second natural language answer.

In some embodiments, the system may further process, using a first trained machine learning (ML) component, the dialog history to generate the first plurality of natural language questions, wherein the first trained ML component is determined by: (1) processing, using a second trained ML component, second dialog history and a third natural language answer to generate a third natural language question; (2) processing, using a third ML component, the second dialog history to generate a fourth natural language question; (3) determining a similarity between the third natural language question and the fourth natural language question; and (3) based on the similarity, determining the first trained ML component as an update of the third ML component.

In some embodiments, the system may further process the dialog history and the first natural language question to generate metadata associated with a context of the first natural language answer, where the metadata corresponds to natural language of a document retrieved using a search engine query including the first natural language question, the first likelihood is determined further using the metadata, and the first output is generated further using the metadata.

A system of the present disclosure may receive first input data corresponding to a first natural language user input. The system may generate a plurality of natural language questions related to the first natural language user input, the plurality of natural language questions including a first natural language question and a second natural language question. The system may generate a first natural language answer responsive to the first natural language question. The system may generate a second natural language answer responsive to the second natural language question. Based on the first natural language user input, the first natural language question, and the first natural language answer, the system may generate a first output responsive to the first natural language user input and cause presentation of the first output.

In some embodiments, based on the first natural language user input, the first natural language question, and the second natural language question, the system may further determine: (1) the first natural language question is semantically similar to the first input data, where the first natural language answer is determined based on determining the first natural language question is semantically similar to the first input; and (2) the second natural language question is semantically similar to the first input, where the second natural language answer is determined based on determining the second natural language question is semantically similar to the first input. Based on the first natural language user input, the first natural language question, the second natural language question, the first natural language answer, and the second natural language answer, the system may determine: (1) a first likelihood that presentation of a first output associated with the first natural language answer will result in a satisfactory user experience; and (2) a second likelihood that presentation of a second output associated with the second natural language answer will result in the satisfactory user experience. Based on the first likelihood and the second likelihood, the system may determine to generate the first output using the first natural language answer instead of the second natural language answer.

In some embodiments, the system may further process, using a first trained machine learning (ML) component, the first natural language user input to generate the plurality of natural language questions. The system may process, using a second trained ML component: (1) the first natural language user input and the first natural language question to determine the first natural language question is semantically similar to the first input; and (2) the first natural language user input and the second natural language question to determine the second natural language question is semantically similar to the first input. The system may process, using a third trained ML component configured to use a search engine to generate a natural language answer responsive to a natural language question: (1) the first natural language user input and the first natural language question to generate the first natural language answer; and (2) the first natural language user input and the second natural language question to generate the second natural language answer. The system may process, using a fourth trained ML component, the first natural language user input, the first natural language question, the second natural language question, the first natural language answer, and the second natural language answer to determine: (1) a first likelihood that that presentation of a first output associated with the first natural language answer will result in a satisfactory user experience; and (2) a second likelihood that presentation of a second output associated with the second natural language answer will result in the satisfactory user experience, where the first output is generated using the first natural language answer instead of the second natural language answer based on the first likelihood and the second likelihood.

In some embodiments, the system may further process the first natural language user input and the first natural language question to generate metadata associated with a context of the first natural language answer, where the metadata corresponds to natural language of a document retrieved using a search engine query including the first natural language question, and the first output is generated further using the metadata.

In some embodiments, where the plurality of natural language questions further includes a third natural language question, the system may further process, using a first trained machine learning (ML) component configured to generate a natural language question configured to elicit a factual response, the first natural language user input to generate the first natural language question. Using a second trained ML component configured to generate a natural language question configured to elicit a response including at least two words, the system may process the first natural language user input to generate the second natural language question. Using a third trained ML component configured to generate a natural language question based on the natural language question being associated with a plurality of users' inputs, the system may process the first natural language user input to generate the third natural language question.

In some embodiments, the system may process, using a first trained machine learning (ML) component, the first natural language user input to generate the plurality of natural language questions, where the first trained ML component is determined by: (1) processing, using a second trained ML component, dialog history and a third natural language answer to generate a third natural language question; (2) processing, using an third ML component, the dialog history \ to generate a fourth natural language question; (3) determining a similarity between the third natural language question and the third natural language question; and (4) based on the similarity, determining the first trained ML component as an update of the third ML component.

In some embodiments, the system may further perform NLU processing using the first natural language user input to determine NLU output data including at least an intent corresponding to the first natural language user input. The system may process, using a second ML component, the first natural language user input and the NLU output data to generate a second output. The system may determine a first likelihood that presentation of the first output will result in a satisfactory user experience and a second likelihood that presentation of the second output will result in the satisfactory user experience, where causing the presentation of the first output is based on the first likelihood and the second likelihood.

In some embodiments, the system may further process the first natural language user input to determine at least a first entity included in the first natural language user input, where the plurality of natural language questions includes the at least first entity.

Teachings of the present disclosure provide, among other things, an improved user experience by providing a system for open-domain response generation capable of generating coherent and engaging responses to user inputs. The system uses one or more question generators to generate one or more questions associated with the user input, which correspond to different formats (e.g., factual questions, open-ended questions, trending questions, etc.). After filtering the questions based on a relevance to the dialog, the system uses one or more web-based answer generators to determine answers responsive to the filtered questions. After filtering the answers based on a relevance to the dialog and a responsiveness of the determined answer (e.g., whether the answer is responsive to the question, how accurate the answer is, a semantic similarity between the answer and the question, etc.), the system generates a response to the user input based on the user input, a dialog history, the questions, and the answers, where the questions, answers, and any data contextually supportive of the answers are of a size that allow the system to perform cross-attention across the dialog history and the questions, answers, and contextually supportive data. As a result of the cross-attention and based on the responses being generated based on the answers and contextually supportive data, the system is capable of providing the coherent and engaging responses to the user inputs. Further, because the system uses question generators to determine questions associated with the user input, which are used in generation of the answers and the ultimate response, the system is capable of generating coherent and engaging responses, even if the user input is short and ambiguous. Even further, because the system uses web-based answers generators to determine answers to the questions, the system is capable of generating responses from a dynamic information pool.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A illustrates an example interaction between a user and a user device/system component(s) of a system 100 configured to generate a natural language responses to user inputs. The system 100 may include a user device 110, local to a user 105, in communication with a system component(s) 120 via a network(s) 199. The network(s) 199 may include the Internet and/or any other wide- or local-area network, and may include wired, wireless, and/or cellular network hardware.

As shown in FIG. 1A, the user 105 may provide a first user input 140 of "I have been trying to get back into skiing, I think I might book a trip this year." In some embodiments, the first user input (140) may not be the first user input of a user-system dialog. The user device 110 and/or the system component(s) 120 may process the first user input to generate (148) first question data related to the first user input 140 and/or usage data (i.e., related to the ongoing user-system dialog and/or a one or more previous user-system dialogs involving the user 105. For example, the usage data may correspond to one or more previous user inputs and/or system-generated response during the instant and/or one or more previous dialogs. The first question data may represent one or more questions associated with the first user input 140 and/or the usage data. For example, the first question data may represent "what is skiing," "what are the best skiing locations," "what is the best time to book a skiing trip," and/or the like. The first question data may be generated using one or more question generator components, which may include one or more question generators configured to generate the one or more questions represented by the first question data. In some embodiments, the one or more questions are associated with an entity represented in the first user input 140 and/or the usage data. The question generator component(s), and its corresponding processing, is described in further detail herein below with respect to FIG. 2.

The user device 110 and/or the system component(s) 120 may filter (150) the first question data based on relevance to determine second question data. For example, the user device 110 and/or the system component(s) 120 may process the first question data to determine one or more questions (e.g., corresponding to a subset of the first question data) that are relevant (e.g., semantically similar, such as based on a cosine similarity or the like) to the first user input 140 and/or the usage data. A question may be determined to be semantically similar to the first user input 140 and/or the usage data if the question has a meaning that is similar to the first user input 140 and/or the usage data. For example, a question of "what are the best skiing destinations" may be determined to be semantically similar to the first user input 140, whereas a question of "what are the best golf courses in the United States" may be determined to not be semantically similar to the first user input 140. If a question represented by the first question data is determined to not be relevant to (e.g., not associated with) the first user input (140) and/or the usage data, then the system 100 may cease processing with respect to that question of the first question data (e.g., the question will not be included in the second question data). In some embodiments, the user device 110 and/or the system component(s) 120 may filter (150) the first question data based on relevance to determine the second question data using a question ranking component, which is described in further detail herein below with respect to FIG. 2.

The user device 110 and/or the system component(s) 120 may generate (152) first answer data responsive to the second question data. The first answer data may represent one or more answers responsive to the one or more questions represented by the second question data. In some embodiments, the user device 110 and/or the system component(s) 120 may be configured to generate the first answer data to be associated with the first user input (140) and/or the usage data. For example, continuing the example provided above with respect to the first question data, the first answer data may represent "skiing is the use of skis to glide on snow," "[location] is widely considered one of the best skiing locations in the United States," "skiing is a thrilling experience," "the best time to go skiing is between December and April," or the like. In some embodiments, the user device 110 and/or the system component(s) 120 may use an answer generator component(s) including one or more answer generators to generate (152) the first answer data. The answer generator component(s), and its corresponding processing, is described in further detail herein below with respect to FIG. 3.

The user device 110 and/or the system component(s) 120 may filter (154) the first answer data based on accuracy to determine second answer data. For example, the user device 110 and/or the system component(s) 120 may determine one or more answers, in the second answer data, based on the one or more answers being related (e.g., semantically similar) to the first user input (140) and/or the usage data. Further, the user device 110 and/or the system component(s) 120 may determine the second answer data based on a confidence associated with the responsiveness of the answer(s) represented by the first answer data (e.g., based on how responsive the answer(s) are to the question(s) represented by the second question data, such as how accurate the answer is, a semantic similarity between the answer(s) and the question(s), etc.). Based on whether the one or more answers represented by the first answer data are related to the first user input (140) and/or the usage data and the confidence associated with the responsiveness of the one or more answer(s) represented by the first answer data, the user device 110 and/or the system component(s) 120 may determine the second answer data. In some embodiments, the user device 110 and/or the system component(s) 120 may filter (154) the first answer data based on responsiveness to determine the second answer data using an answer ranking component, which is described in further detail herein below with respect to FIG. 2.

The user device 110 and/or the system component(s) 120 may, using the second answer data, generate (156) output data responsive to the first user input 140. The output data may represent a natural language response to the first user input 140. For example, the output data may represent the system response (142) of "[Location] is considered an excellent skiing destination, especially between December and April." In some embodiments, the user device 110 and/or the system component(s) 120 may generate the output data using more than one answer represented in the second answer data. In some embodiments, the user device 110 and/or the system component(s) may generate the output data using a response generation component, which is described in further detail herein below with respect to FIG. 2.

As shown in FIG. 1A, after the user device 110 outputs the system response 142, the user 105 may provide a second user input 144, for example, of "That sounds great. I will have to look into booking a ski lodge out there around that time." The user device 110 and/or the system component(s) 120 may process as described above to generate a second system response 146 of "the ABC lodge is highly rated and has easy access to the slopes." It will be appreciated that while FIG. 1A illustrates two user inputs and two corresponding system outputs, that the processing of FIG. 1A can be performed for n user inputs and n corresponding system outputs.

FIG. 1B illustrates example components and processing of a system for generating a natural language response to a user input. As shown in FIG. 1B, the system 100 may include a conversation manager component 180, a response generator component 170, and a knowledge source(s) storage 190. In some embodiments, the conversation manager component 180 may include a strategy selection component 182, a response generation component 184, a harmful speech classifier component 186, and a response ranking component 188. In some embodiments, the response generator component 170 may include response generator component(s) 172a-n and a QA response generator component 174.

With reference to FIG. 1B the conversation manager component 180 may receive ASR output data 162 and dialog history data 164. The conversation manager component 180 is configured to determine a response to output to a user (e.g., the user 105). In some embodiments, the conversation manager component 180 may determine a response to output to one or more users in order to engage in and/or continue a conversation between the one or more users and the system 100 (e.g., a dialog between the one or more users and the system 100). For example, the conversation manager component 180 may take as input a current user input (e.g., the ASR output data 162) and one or more previous user inputs and/or system-generated responses (e.g., the dialog history data 164), and may generate a response (e.g., response data 189) to be output to further the dialog (e.g., a response that will likely result in an additional user input).

The ASR output data 162 may include a transcript corresponding to a user input received by the user device 110 and/or the system component(s) 120. The user input may request performance of an action. For example, the user input may be "Hey Alexa, can we chat?" "lock the front door," "book me a train ticket to [location]," "book me a ride to [location]," "play [song name] by [artist name]," "what is today's weather," or some other user input requesting performance of an action. In some situations, the user input may be a declarative statement (e.g., an opinion, a belief, a statement of fact, a preference of the user 105, etc.) such as the first user input (140) or "Fall is my favorite season." In other situations, the user input may correspond to a response to a system-generated output. For example, the system may receive the second user input (144) or a user input "No, but I do ski. I am planning a trip to Colorado this winter," in response to the system-generated output "Do you know how to snowboard?"

The user input may be represented by user input data received by the user device 110 and/or the system component(s) 120. The user input data may include various types of data. For example, the user input data may include input audio data when the user input is a spoken natural language input. In the situation where the user input data includes input audio data, the input audio data may correspond to spoken natural language received by one or more microphones of or associated with the user device 110. For further example, the user input data may include input text (or tokenized) data when the user input is a typed natural language user input.

The user device 110 and/or the system component(s) 120 may receive the user input data at a component configured to facilitate processing performed by various components of the system component(s) 120 (e.g., the orchestrator component 430).

In the situation where the user input data is or includes input audio data, the user device 110 and/or the system component(s) 120 may cause the input audio data to be sent an ASR component (e.g., the ASR component 450). In the situation where the user input data is or includes other types of data (e.g., data representing actuation of a physical button, image data of a gesture user input, etc.), the system component(s) 120 may send the user input data to one or more components configured to process the data to generate a text (or tokenized) representation of the data capable of being processed by an NLU component (e.g., the NLU component 460).

In the situation where the user input data is or includes input audio data and the input audio data is sent to the ASR component, the ASR component processes the input audio data to generate the ASR output data 162 including a text (or tokenized transcript) of the input audio data. Processing of the ASR component is described in further detail herein below in connection with FIG. 4. The user device 110 and/or the system component(s) 120 may cause the ASR output data 162 to be sent to the NLU component.

In situations where the user input data is or includes data other than input audio data, and a component(s) of the system component(s) 120 processes to generate text (or tokenized data) representing the user input data, the user device 110 and/or the system component(s) 120 may cause this text (or tokenized) data to be sent to the NLU component. In situations where the user input data is or includes input text data or a typed natural language user input, the user device 110 and/or the system component(s) 120 may cause the input text data to be sent to the NLU component.

The NLU component processes the ASR output data 162 (or other received text or tokenized data representing the user input) and generates NLU output data (e.g., NLU output data 166) indicating at least an intent (e.g., including an intent indicator) representing the user input, and optionally at least one entity included in the user input. Processing of the NLU component is described in further detail herein below in connection with FIG. 4. The user device 110 and/or the system component(s) 120 may cause the NLU output data to be sent to the response generator component 170.

In response to receiving the user input data, a component of the user device 110 and/or the system component(s) 120 may query a dialog storage for the dialog history data 164. The dialog storage may store dialog history data for one or more dialogs, where the dialog history data for a single dialog may include data representing one or more turn(s) of the dialog. For example, the dialog storage may be queried using a user identifier of the user 105 and/or a device identifier of the user device 110 and/or a dialog identifier associated with the user input data. The dialog history data 164 may include one or more natural language representations of previous user inputs and/or system-generated responses of a dialog. The dialog history data 164 may further include natural language understanding data (e.g., NLU output data, intents, entities, slots, etc.) associated with the one or more previous user inputs and/or system-generated responses of the dialog.

The user device 110 and/or the system component(s) 120 may cause the ASR output data 162 and the dialog history data 164 to be sent to the conversation manager component 180. In some embodiments, the user device 110 and/or the system component(s) 120 may cause the ASR output data 162 and the dialog history data 164 to be sent to the conversation manager component 180 in response to determining a triggering condition has been met. For example, the triggering condition may correspond to the user input data, or a previous user input, requesting that the user device 110 and/or system component(s) 120 operate in a conversation mode. When the system 100 receives such a request, the system 100 may store an indicator in association with a user profile of the user 105 and/or a device profile of the user device 110 representing the device and/or system component(s) 120 are to operate in the conversation mode for any subsequent user inputs. In some embodiments, the triggering condition may be met based on the system 100 receiving a user input. In some embodiments, the system 100 may prompt the user for permission prior to operating in the conversation mode. In some embodiments, the user device 110 and/or the system component(s) 120 may cause the ASR output data 162 and the dialog history data 164 to be sent to the conversation manager component 180 based on determining the user input is part of a user-system dialog.

As shown in FIG. 1B, the ASR output data 162 and/or the dialog history data 164 may be received at the strategy selection component 182 of the conversation manager component 180, which is configured to process the ASR output data 162 and the dialog history data 164 to determine whether the conversation manager component 180 should process to cause the generation of a response to the ASR output data 162. In some embodiments, the strategy selection component 182 may be configured to determine whether one or more (e.g., a subset) of the response generators included in the response generation component 184 should be used to generate the response to the ASR output data 162. The strategy selection component 182 may send the ASR output data 162 and the dialog history data 164 to the response generation component 184.

The response generation component 184 is configured to determine one or more responses to the ASR output data 162 and/or the dialog history data 164. The response generation component 184 may send the ASR output data 162 and/or the dialog history data 164 to the response generator component 170.

The response generator component 170 may further receive NLU output data 166. As discussed above, the NLU output data 166 may correspond to a natural language representation of the user input including at least an intent corresponding to the user input and at least a first entity included in the user input. The response generator component 170 may include one or more response generators 172*a-n* configured to generate one or more responses to a current user input using the ASR output data 162, the dialog history data 164, and/or the NLU output data 166. In some embodiments, the response generators 172*a-n* may implement one or more ML models, such as Dialog Generative Pretrained Transformers (DialoGPT), Generative Pretrained Transformer 2 (GPT-2), T5, Bidirectional AutoRegressive Transformer (BART), BlenderBot, etc.

The response generator component 170 may be configured to query the knowledge source(s) storage 190 for knowledge data 193 associated with the ASR output data 162, the dialog history data 164 and/or the NLU output data 166. For example, the response generator component 170 may query the knowledge source(s) storage 190 for the knowledge data 193 using one or more entities represented in the NLU output data 166 and/or the dialog history data 164. The knowledge source(s) storage 190 may include one or more portions of knowledge data (e.g., corresponding to factual information). In some embodiments, the knowledge data may be retrieved from an external source(s) (e.g., an encyclopedia, website, etc.) and stored in the knowledge source(s) storage 190, for example, in response to the knowledge data being used by the system 100 for processing with respect to a user input. In some embodiments, the knowledge source(s) storage 190 may include a knowledge graph representing associations between portions of knowledge data and example user inputs/system-generated responses (e.g., dialog history data 164) associated with the knowledge data. In some embodiments, the knowledge data may be stored in association with one or more entities included in and/or associated with the knowledge data.

The response generator component 170 may further include the QA response generator component 174 configured to generate one or more responses to the ASR output data 162. In contrast to the response generators 172*a-n*, the QA response generator component 174 may be configured to generate one or more responses to the current user input using the ASR output data 162 and/or the dialog history data 164, without requiring the NLU output data 166. Further details with respect to the processing of the QA response generator component 174 is described herein below in connection with FIG. 2.

Figure 2:
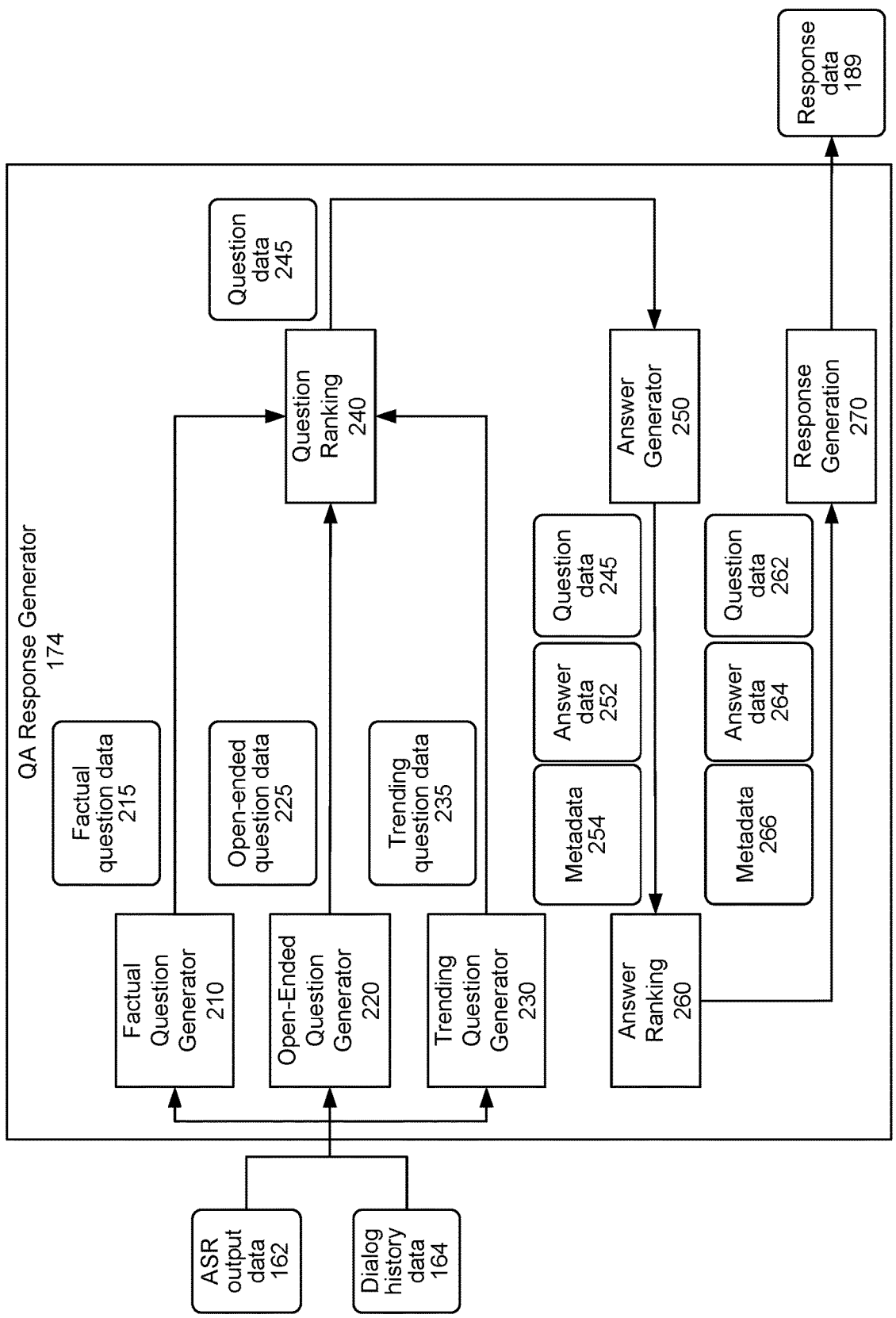
FIG. 2 is a conceptual diagram illustrating example processing performed by the QA response generation component to generate a response to a user input, according to embodiments of the present disclosure.

FIG. 2 shows example processing performed by the QA response generator component 174 to generate one or more responses (e.g., the response data 189) to a user input. As shown in FIG. 2, the QA response generator component 174 may receive the ASR output data 162 and the dialog history data 164 at one or more question generator components, including a factual question generator component 210, an open-ended question generator component 220, and a trending question generator component 230. The one or more question generator components may be configured to generate one or more questions associated with the ASR output data 162 and/or the dialog history data 164.

The factual question generator component 210 may be configured to use the ASR output data 162 and the dialog history data 164 to generate factual question data 215 representing one or more questions associated with the ASR output data 162 and/or the dialog history data 164 that may be answered using a fact(s). In some embodiments, the factual question data 215 may correspond to one or more textual (or tokenized) questions. For example, in a situation where the ASR output data 162 and/or the dialog history data 164 represent that the user 105 has recently started investing in cryptocurrency on the stock market, the factual question generator component 210 may generate factual question data 215*a* representing "What is cryptocurrency," "How to invest in cryptocurrency," and/or the like.

The open-ended question generator component 220 may be configured to use the ASR output data 162 and the dialog history data 164 to generate open-ended question data 225 representing one or more questions associated with the ASR output data 162 and/or the dialog history data 164 that cannot be answered in solely the affirmative or negative (e.g., cannot be answered with a simple yes or no). In some embodiments, the factual question data 215 may correspond to one or more textual (or tokenized) questions. For example, in a situation where the ASR output data 162 and/or the dialog history data 164 represent that the user 105 is planning a ski trip to Colorado next year, the open-ended question generator component 220 may generate open-ended question data 225*a* representing "why do people enjoy skiing," "why is Colorado a good skiing destination," and/or the like.

The trending question generator component 230 may be configured to use the ASR output data 162 and the dialog history data 164 to generate trending question data 235 representing one or more questions associated with the ASR output data 162 and/or the dialog history data 164 that are popular among other users of the system 100. In some embodiments, the trending question data 235 may correspond to one or more textual (or tokenized) questions. For example, in a situation where the ASR output data 162 and/or the dialog history data 164 represent that the user is considering buying an Amazon Echo device, the factual question generator component 210 may generate factual question data 215*a* representing "What is known about the Amazon Echo device" and/or the like.

While FIG. 2 illustrates the factual question generator component 210, the open-ended question generator component 220, and the trending question generator component 230, one skilled in the art would recognize that the disclosure herein is not intended to be limited to such question generator components. In general, the QA response generator component 174 may include various question generators capable of generating questions associated with various attributes.

Figure 3:
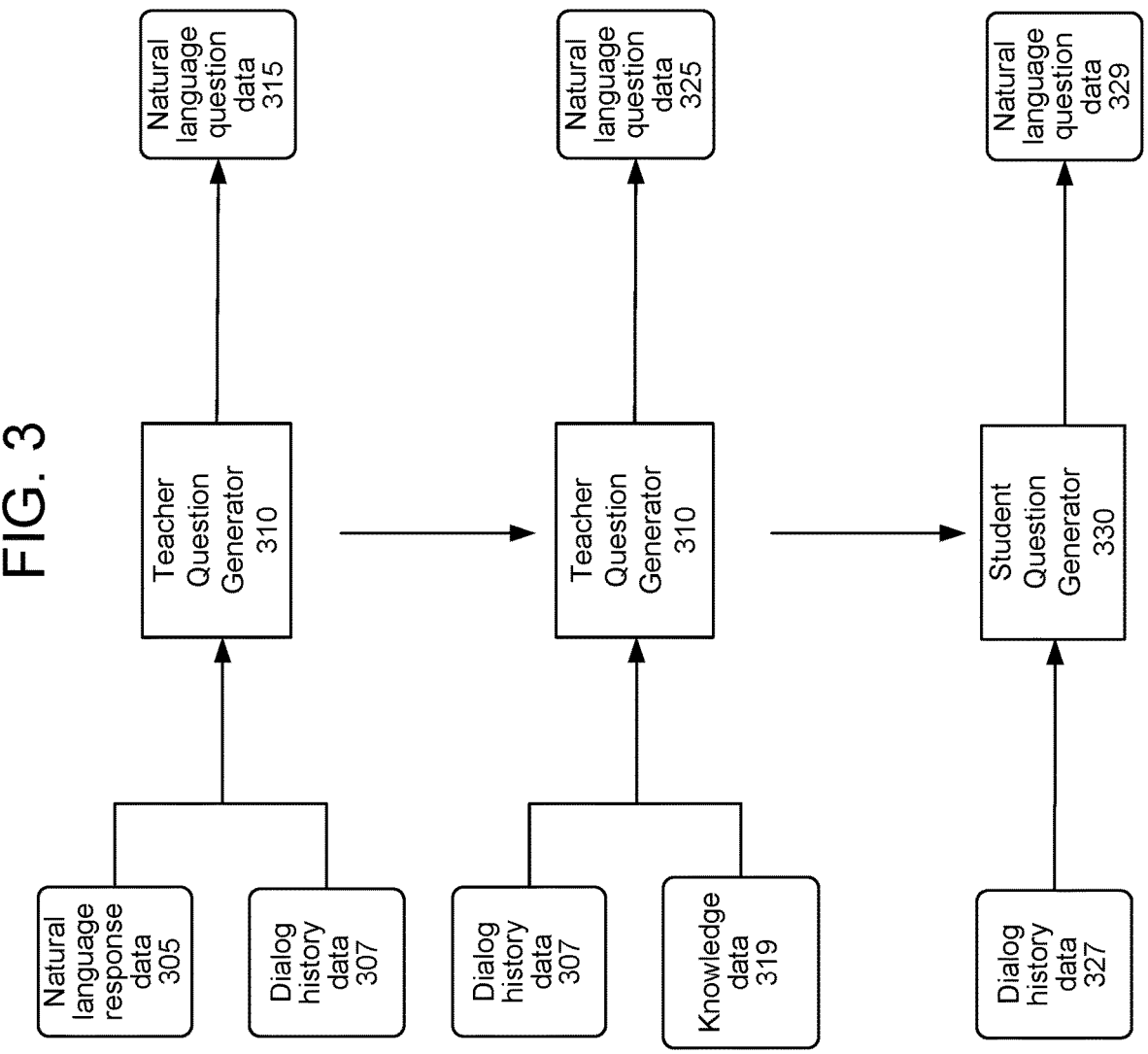
FIG. 3 is a conceptual diagram illustrating example processing performed by the system to configure a question generator component, according to embodiments of the present disclosure.

FIG. 3 illustrates an example process to train a question generator (e.g., the factual question generator component 210, the open-ended question generator component 220, the trending question generator component 230, etc.).

As shown in FIG. 3, a teacher question generator component 310 may be configured to process natural language response data 305 and dialog history data 307 to generate natural language question data 315 that would result in a response corresponding to the natural language response data 305. The teacher question generator component 310 may implement an ML model. The ML model may be trained to take as input a training pair including (1) natural language response data (e.g., 305) corresponding to a natural language response to a question asked during a dialog; and (2) dialog history data (e.g., 307) corresponding to one or more previous natural language questions and responses of the dialog. In some instances, the natural language response data and the dialog history data may correspond to a portion of a corpus of training data (e.g., the Wizard of the Internet dataset, ELI5 dataset, etc.). The corpus of training data may include one or more training pairs including one or more questions of a dialog and one or more responses to the one or more questions. The corpus of training data may be associated with a particular type of information (e.g., factual information) or may be associated with a particular type of conversation or questions (e.g., a factual conversation, a conversation including questions configured to elicit long-form responses, a conversation about trending topics, etc.). The teacher question generator component 310 may be tasked with processing the natural language response data and the dialog history data to determine natural language question data (e.g., 315) corresponding to the natural language question that resulted in the natural language response corresponding to the natural language response data. The natural language question data may be compared to training natural language question data corresponding to the natural language response data to determine a similarity between the natural language question data and the training natural language question data (e.g., a semantic similarity or a lexical similarity) and, based on the similarity, the ML model may be configured (e.g., at least one parameter (e.g., a weight) of the ML model may be configured).

As further shown in FIG. 3, the teacher question generator component 310 may be configured to process dialog history data 307 and knowledge data 319 to generate natural language question data 325. The teacher question generator component 310 may implement an ML model (e.g., the configured ML model discussed above). The teacher question generator component 310 may be used to process the dialog history data and the knowledge data to determine natural language question data (e.g., 325) corresponding to a next natural language question corresponding to the dialog history data. The resulting natural language question data may be combined with the dialog history data to generate a dataset including the dialog history data and the natural language question data. The dataset may be used to train a ML model implemented by a student question generator component 330.

As shown in FIG. 3, the student question generator component 330 may be configured to process dialog history data 327 to generate natural language question data 329 representing a next question of a dialog associated with the dialog history data 327. The student question generator component 330 may implement an ML model. The ML model may be trained to take as input dialog history data (e.g., 327) corresponding to one or more natural language questions and responses of a dialog. In some instances, the dialog history data may correspond to a portion of a knowledge-based corpus of training data (e.g., the dataset resulting from training of the ML model of the teacher question generator component 310). The student question generator component 330 may be tasked with processing dialog history data (e.g., a portion of the dialog history data) to determine natural language question data (e.g., 329) corresponding to a next predicted question of the dialog. The natural language question data may be compared to training natural language question data corresponding to the actual next question of the dialog to determine a similarity between the natural language question data and the training natural language question data (e.g., a semantic similarity or a lexical similarity) and, based on the similarity, the ML model may be configured (e.g., at least one parameter (e.g., a weight) of the ML model may be configured). For example, the ML model (or another component) may be configured to process the natural language question data and the training natural language question data (e.g., vector representations of the natural language question data and the training natural language question data) to determine a cosine similarity between the natural language question data and the training natural language question data. In some embodiments, the trained ML model may be implemented by one or more of the question generator component(s) included in the QA response generator component 174. In some embodiments, one or more of the question generator component(s) included in the QA response generator component 174 may implement/correspond to a Benchmark for Zero-shot Evaluation of Information Retrieval Models (BEIR) model (e.g., the trending question generator component 230).

With reference once more to FIG. 2, the factual question generator component 210, the open-ended question generator component 220, and the trending question generator component 230 may send the factual question data 215, the open-ended question data 225, and the trending question data 235, respectively, to a question ranking component 240. In some embodiments, a subset of the question generator components may process the ASR output data 162 and the dialog history data 164 to generate the corresponding question data, and the corresponding question data may be sent to the question ranking component 240.

The question ranking component 240 processes the factual question data 215, the open-ended question data 225, and the trending question data 235 to determine question data 245, which corresponds to a subset (e.g., top-k) of the factual question data 215, the open-ended question data 225, and the trending question data 235. For example, in some embodiments, the subset may correspond to a top-2 questions of the factual question data 215, a top-2 questions of the open-ended question data 225, and a top-1 question of the trending question data 235. Although not illustrated in FIG. 2, the question ranking component 240 may further process the ASR output data 162 and the dialog history data 164 to generate the question data 245. The subset of the factual question data 215, the open-ended question data 225, and the trending question data 235 may be determined based on their relevance to the ASR output data 162 and/or the dialog history data 164. For example, the question ranking component 240 may determine a relevance between input question data (e.g., factual question data 215, the open-ended question data 225, and the trending question data 235) and the ASR output data 162 and the dialog history data 164 to determine whether the input question data is semantically similar to the ASR output data 162 and/or the dialog history data 164 (e.g., based on a cosine similarity). The question ranking component 240 may send the question data 245 to the answer generator component 250.

In some embodiments, the question ranking component 240 may implement a ML model. For example, the ML model may be configured to process the ASR output data 162, the dialog history data 164, and question data (e.g., the factual question data 215, the open-ended question data 225, and the trending question data 235) and generate a subset of question data based on a similarity (e.g., a relevance) between the question data and the ASR output data 162 and/or the dialog history data 164. The ML model may be trained using a search engine dataset corresponding to a plurality of natural language search queries and documents associated with the natural language queries. During training, the ML model may take as input a natural language training pair including a natural language search query and a natural language document associated with the natural language search query (e.g., a document selected by a user as a result of the search query). The ML model may be tasked with determining a score representing a relevance between the natural language document and the natural language search query. Based on the score, the ML model may be configured accordingly (e.g., based on a comparison between the determined score and a training score of the dataset, at least one parameter (e.g., a weight) of the ML model may be configured). In some embodiments, the ML model may be a bi-encoder (e.g., a Generalizable T5 Retriever (GTR)).

The answer generator component 250 processes the question data 245 using one or more answer generators to generate answer data 252 and/or metadata 254. Although not illustrated in FIG. 2, the answer generator component 250 may further process the ASR output data 162 and/or the dialog history data 164 to determine the answer data 252 and the metadata 254. The answer data 252 may correspond to one or more natural language answers responsive to the question data 245. For example, if the question data 245 include the question "What is the capital of Alaska," then the answer generator component 250 may determine answer data 252 including the answer of "Juneau." In some embodiments, the answer data 252 may be retrieved from web-based document(s). In some embodiments, one or more answers of the answer data 252 may be generated based on the web-based document(s). The metadata 254 may correspond to contextual knowledge data associated with the answer data 252. For example, if the answer data 252 includes the answer of "Juneau," then the metadata 254 generated by the answer generator component 250 may include "The City and Borough of Juneau, more commonly known as Juneau, is the capital city of Alaska." As is discussed below, the metadata 254 may be used to determine whether the answer data 252 is responsive to the question data 245. The metadata may further be used in generation of a response to a user input. In some embodiments, the metadata 254 may be retrieved from the web-based documents associated with the answer data 252. In some embodiments, the metadata 254 may be generated based on the web-based documents associated with the answer data 252. For example, the metadata 254 may represent the portion (e.g., words, sentences, etc.) of the web-based document that the answer data 252 are based on.

In some embodiments, the answer generator component 250 may implement a ML model. For example, the ML model may be configured to process the ASR output data 162, the dialog history data 164, and the question data 245 to determine answer data 252 and the metadata 254. In some embodiments, the ML model may be a web-based question-answer generation model. In some embodiments, the output of the ML model may be a natural language answer responsive to the question input to the ML model. In other embodiments, the output of the ML model may be a graph/table representation of an answer responsive to the question input to the model. In such embodiments, the system 100 may further include a component configured to process the output of the ML model to generate a natural language representation of the answer.

The answer generator component 250 may send the question data 245, the answer data 252, and the metadata 254 to the answer ranking component 260. The answer ranking component 260 processes the question data 245, the answer data 252, and the metadata 254 to determine answer data 264 and corresponding metadata 266 and question data 262 based on a responsiveness of the one or more answers (e.g., whether the answer is responsive to the question, how accurate the answer is based on the metadata 266, a semantic similarity between the answer and the question, etc.) in the answer data 252 and/or a relevance between the answer data 252 and the ASR output data 162 and/or the dialog history data 164. Although not illustrated in FIG. 2, the answer ranking component 260 may further process the ASR output data 162 and/or the dialog history data 164 to determine the answer data 264. The answer data 264 and the metadata 266 may represent a subset (e.g., top-k) of the answer data 252 and corresponding metadata 254. In some embodiments, the answer ranking component 260 may be configured to determine the subset of answer data based on various characteristics including a confidence, agreement, recency, authority, and/or safety associated with an answer represented by the answer data 252 to a question represented by the question data 245.

In some embodiments, the answer ranking component 260 may implement a ML model. For example, the ML model may be configured to process the ASR output data 162, the dialog history data 164, the question data 245, the answer data 252, and the metadata 254, and determine a subset of answer data (e.g., the answer data 264) based on a responsiveness of an answer of the answer data to a question of the question data (e.g., whether the answer data 252 is responsive to the question data 245, how accurate the answer data 252 is, a semantic similarity between the answer data 252 (and/or the metadata 254) and the question data 245). In some embodiments, the responsiveness of the answer of the answer data to a question of the question data may be determined based on metadata (e.g., the metadata 254) associated with the answer. During training, the ML model may take as input a natural language training pair including a dialog history and a natural language input (e.g., a sentence). The ML model may be tasked with determining a score representing a responsiveness of the natural language input to the dialog history. For example, the ML model may be configured to encode the dialog history and the natural language input and compare the encoded dialog history and the encoded natural language input. Based on the score, the ML model may output a representation of whether the natural language input is responsive to the dialog history. Based on the score and/or the representation of accuracy, the ML model may be configured accordingly (e.g., based on a comparison of the score and a training score of responsiveness corresponding to the training pair).

The answer ranking component 260 may send the question data 262, the answer data 264, and the metadata 266 to the response generation component 270. The response generation component 270 processes the question data 262, the answer data 264, and the metadata 266 to generate the response data 189. Although not illustrated in FIG. 2, the response generation component 270 may further process the ASR output data 162 and the dialog history data 164 to generate the response data 189.

In some embodiments, the response generation component 270 may implement a ML model. For example, the ML model may be configured to process the ASR output data 162, the dialog history data 164, the question data 262, the answer data 264, and the metadata 266 to generate the response data 189. During training, the ML model may take as input a concatenation of a dialog history (e.g., including one or more user inputs and/or system-generated responses), a natural language question, a natural language answer responsive to the natural language question, and natural language data contextually associated with the natural language answer (e.g., words, sentences, etc. that may be used to determine the natural language answer). The ML model may be tasked with generating a natural language response associated with the dialog history, where the response is generated based on the natural language answer and natural language data. In some embodiments, the natural language answer and the natural language data may be of a size that allows the ML model to perform cross-attention across the dialog context and the natural language answer and natural language data. This may allow the ML model to generate a contextually coherent and engaging natural language response. In some embodiments, the ML model may correspond to a decoder-only Transformer (e.g., the Blenderbot3 response generator model).

Although not illustrated, in some embodiments, the factual question generator component 210, the open-ended question generator component 220, the trending question generator component 230, the question ranking component 240, the answer generator component 250, the answer ranking component 260, and/or the response generation component 270 may further process the knowledge data 193 (see FIG. 1B) to generate their corresponding output(s).

With reference once more to FIG. 1B, the QA response generator component 174 may send the response data 189 to the conversation manager component 180. As shown in FIG. 1B, in some embodiments, the response generator component 170 may send the response data 189, along with the response data generated by the response generator component(s) 172a-n, to the response generation component 184 of the conversation manager component 180 as response data 176.

The response generation component 184 may send the response data 176 to the harmful speech classifier component 186. The harmful speech classifier component 186 processes the response data 176 to generate a subset of the response data 176. The subset of the response data 176 may include the responses from the response data 176 that are determined to be appropriate for output. For example, the harmful speech classifier component 186 may be configured to determine whether a response of the response data 176 includes sensitive information (e.g., includes profanity, confidential information, financial information, medical information, etc.), in which case the harmful speech classifier component 186 may cause the system 100 to cease processing with respect to that response.

In some embodiments, the harmful speech classifier component 186 may implement a ML model. For example, the ML model may be configured to determine whether a response represented by response data 176*a* includes sensitive information (e.g., includes profanity, confidential information, financial information, medical information, etc.). During training, the ML model may take as input a natural language input and a natural language list of sensitive words. The ML model may be tasked with determining whether the natural language includes a word(s) included in the natural language list of sensitive words. The ML model may output a score representing whether the natural language input includes a word(s) included in the natural language list. Based on the score, the model may be configured accordingly (e.g., at least one parameter (e.g., a weight) of the ML model may be configured). In some embodiments, after the model has been configured, the model may be retrained in a similar fashion, but using a dataset of natural language inputs that were incorrectly labeled as non-sensitive (e.g., by another ML model or a human annotator). In some embodiments, the ML model may be a Bi-Long Short-Term Memory (Bi-LSTM) classifier. In other embodiments, the ML model may be a large language model (e.g., a Robustly optimized Bidirectional Encoder Representations from Transformers approach (RoBERTa) model).

The harmful speech classifier component 186 may send the subset of the response data 176 to the response ranking component 188. The response ranking component 188 processes the subset of the response data 176, the ASR output data 162, and the dialog history data 164 to determine one or more scores for one or more of the responses in the subset of the response data 176. The one or more scores may represent a likelihood that presentation of one or more of the responses will result in a subsequent user input related to the one or more responses.

In some embodiments, the response ranking component 188 may implement a ML model. For example, the ML model may be configured to process the ASR output data 162, the dialog history data 164, and the subset of the response data 176 to determine one or more scores for one or more responses in the subset of the response data 176, where the one or more score may represent a likelihood that presentation of one or more of the responses will result in a subsequent user input related to one or more responses of the subset of response data 176. In some embodiments, the ML model may correspond to a BERT-based neural response ranker. In some embodiments, the ML model may correspond to a Transformer model (e.g., a DialogRPT model). In other embodiments, the ML model may correspond to a polyencoder. In some embodiments, the response ranking component 188 may be a rule-based response selector.

Based on the determined score(s), the response ranking component 188 may select one or more responses of the subset of response data 176 to be sent for output. As shown in FIG. 1B, based on the determined scores, the response ranking component 188 selects and sends the response data 189 for output.

Although not illustrated, the conversation manager component 180 may send the response data 189 to an output rendering component.

The output rendering component may be any component configured to generate output data from the response data 189. For example, the output rendering component may include or be a TTS component (e.g., the TTS component 480 illustrated in and described with respect to FIG. 4 below). That is, the output rendering component may be configured to generate output audio data including synthesized speech corresponding to the response data 189. For further example, the output rendering component may include or be a component configured to generate visual output data (e.g., output image and/or video data) corresponding to the response data 189.

In situations where the output rendering component is or includes a TTS component, the TTS component may process the response data 189 to generate output audio data including synthesized speech corresponding to the response data 189. The user device 110 and/or the system component(s) 120 may send the output audio data to the user device 110 for presentation to the user 105.

In some situations, the user device 110 and/or the system component(s) 120 may cause the response data 189 to be presented as visual content (e.g., an image or video). In such situations, the output rendering component may generate output visual data corresponding to the response data 189, and the user device 110 and/or the system component(s) 120 may cause the output visual data to be presented to the user 105.

In some situations, the user device 110 and/or the system component(s) 120 may cause the response data 189 to be presented as audio as well as visual content. In such situations, the output rendering component may generate output multimedia data including the aforementioned output audio data and the aforementioned output visual data, and the user device 110 and/or the system component(s) 120 may cause the output multimedia data to be presented.

Figure 4:
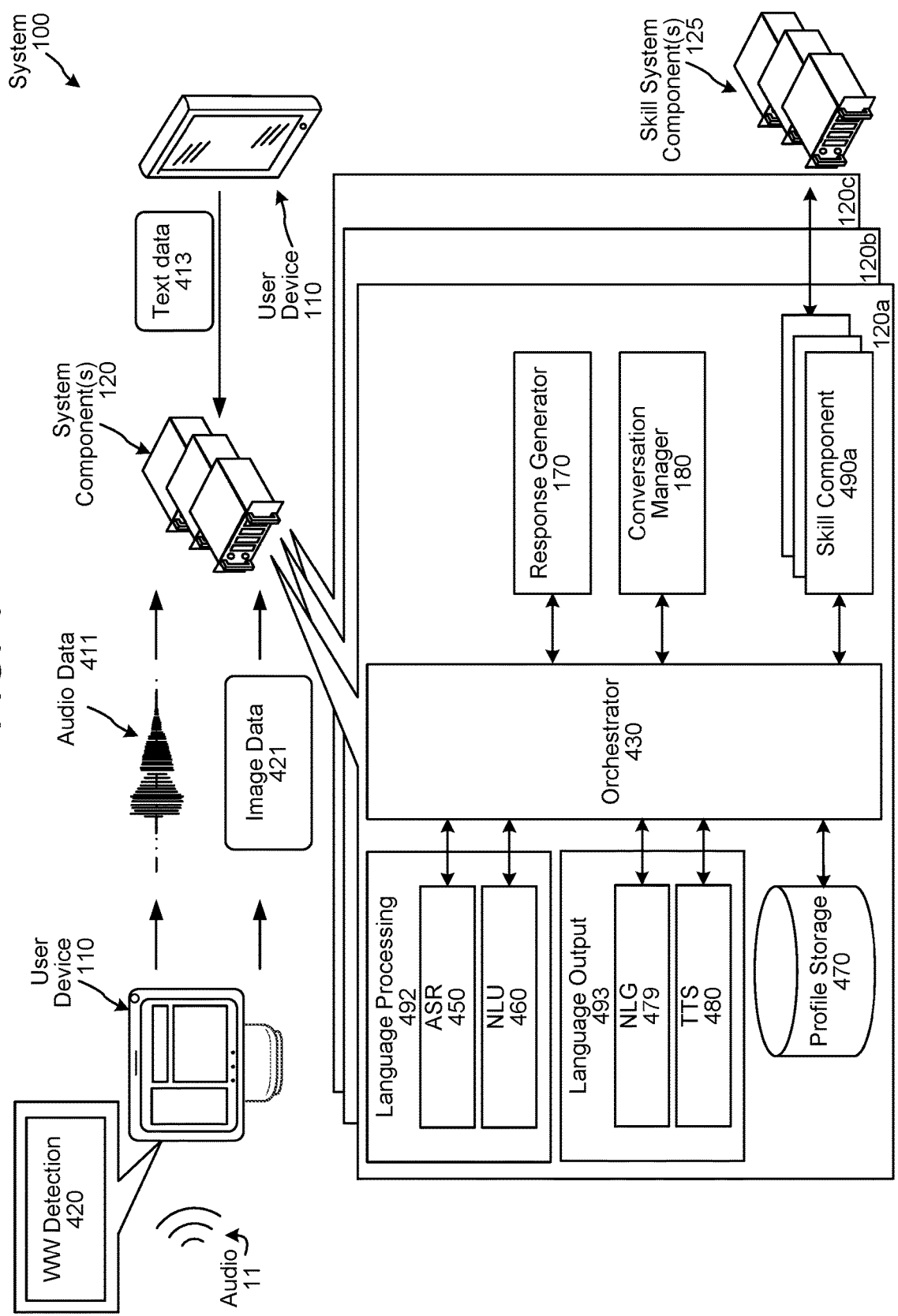
FIG. 4 is a conceptual diagram of components of the system, according to embodiments of the present disclosure.

The system 100 may operate using various components as described in FIG. 4. The various components may be located on same or different physical devices. Communication between various components may occur directly or across a network(s) 199. The user device 110 may include audio capture component(s), such as a microphone or array of microphones of a user device 110, captures audio 11 and creates corresponding audio data. Once speech is detected in audio data representing the audio 11, the user device 110 may determine if the speech is directed at the user device 110/system component(s) 120. In at least some embodiments, such determination may be made using a wakeword detection component 420. The wakeword detection component 420 may be configured to detect various wakewords. In at least some examples, each wakeword may correspond to a name of a different digital assistant. An example wakeword/digital assistant name is "Alexa." In another example, input to the system may be in form of text data 413, for example as a result of a user typing an input into a user interface of user device 110. Other input forms may include indication that the user has pressed a physical or virtual button on user device 110, the user has made a gesture, etc. The user device 110 may also capture images using camera(s) 618 of the user device 110 and may send image data 421 representing those image(s) to the system component(s) 120. The image data 421 may include raw image data or image data processed by the user device 110 before sending to the system component(s) 120. The image data 421 may be used in various manners by different components of the system to perform operations such as determining whether a user is directing an utterance to the system, interpreting a user command, responding to a user command, etc.

The wakeword detection component 420 of the user device 110 may process the audio data, representing the audio 11, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 420 and/or input is detected by an input detector, the user device 110 may "wake" and begin transmitting audio data 411, representing the audio 11, to the system component(s) 120. The audio data 411 may include data corresponding to the wakeword; in other embodiments, the portion of the audio corresponding to the wakeword is removed by the user device 110 prior to sending the audio data 411 to the system component(s) 120. In the case of touch input detection or gesture-based input detection, the audio data may not include a wakeword.

In some implementations, the system 100 may include more than one system component(s) 120. The system component(s) 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 420 may result in sending audio data to system component(s) 120a for processing while detection of the wakeword "Computer" by the wakeword detector may result in sending audio data to system component(s) 120b for processing. The system may have a separate wakeword and system for different skills/systems (e.g., "Dungeon Master" for a game play skill/system component(s) 120c) and/or such skills/systems may be coordinated by one or more skill component 490 of one or more system component(s) 120.

The user device 110 may also include a system directed input detector 585. (The system component(s) 120 may also include a system directed input detector which may operate in a manner similar to system directed input detector 585.) The system directed input detector may be configured to determine whether an input to the system (for example speech, a gesture, etc.) is directed to the system or not directed to the system (for example directed to another user, etc.). The system directed input detector may work in conjunction with the wakeword detection component 420. If the system directed input detector determines an input is directed to the system, the user device 110 may "wake" and begin sending captured data for further processing (for example, processing audio data using the language processing 492/592, processing captured image data using image processing component or the like). If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector is determining whether an input is potentially device directed. For example, the system may output an orange indicator while considering an input, and may output a green indicator if a system directed input is detected. Other such configurations are possible.

Upon receipt by the system component(s) 120, the audio data 411 may be sent to the orchestrator component 430. The orchestrator component 430 may include memory and logic that enables the orchestrator component 430 to transmit various pieces and forms of data to various components of the system, as well as perform other operations as described herein.

The orchestrator component 430 may send the audio data 411 to a language processing component 492. The language processing component 492 (sometimes also referred to as a spoken language understanding (SLU) component) includes an ASR component 450 and a NLU component 460. The ASR component 450 may transcribe the audio data 411 into text data. The text data output by the ASR component 450 represents one or more than one (e.g., in the form of an N-best list) ASR hypotheses representing speech represented in the audio data 411. The ASR component 450 interprets the speech in the audio data 411 based on a similarity between the audio data 411 and pre-established language models. For example, the ASR component 450 may compare the audio data 411 with models for sounds (e.g., acoustic units such as phonemes, senons, phones, etc.) and sequences of sounds to identify words that match the sequence of sounds of the speech represented in the audio data 411. The ASR component 450 sends the text data generated thereby to an NLU component 460, via, in some embodiments, the orchestrator component 430. The text data sent from the ASR component 450 to the NLU component 460 may include a single top-scoring ASR hypothesis or may include an N-best list including multiple top-scoring ASR hypotheses. An N-best list may additionally include a respective score associated with each ASR hypothesis represented therein.

The language processing system 492 may further include a NLU component 460. The NLU component 460 may receive the text data from the ASR component. The NLU component 460 may attempts to make a semantic interpretation of the phrase(s) or statement(s) represented in the text data input therein by determining one or more meanings associated with the phrase(s) or statement(s) represented in the text data. The NLU component 460 may determine an intent representing an action that a user desires be performed and may determine information that allows a device (e.g., the user device 110, the system component(s) 120, a skill component 490, a skill system component(s) 125, etc.) to execute the intent. For example, if the text data corresponds to "play the 5th Symphony by Beethoven," the NLU component 460 may determine an intent that the system output music and may identify "Beethoven" as an artist/composer and "5th Symphony" as the piece of music to be played. For further example, if the text data corresponds to "what is the weather," the NLU component 460 may determine an intent that the system output weather information associated with a geographic location of the user device 110. In another example, if the text data corresponds to "turn off the lights," the NLU component 460 may determine an intent that the system turn off lights associated with the user device 110 or the user 105. However, if the NLU component 460 is unable to resolve the entity—for example, because the entity is referred to by anaphora such as "this song" or "my next appointment"—the language processing system 492 can send a decode request to another language processing system 492 for information regarding the entity mention and/or other context related to the utterance. The language processing system 492 may augment, correct, or base results data upon the audio data 411 as well as any data received from the other language processing system 492.

The NLU component 460 may return NLU results data (which may include tagged text data, indicators of intent, etc.) back to the orchestrator component 430. The orchestrator component 430 may forward the NLU results data to a skill component(s) 490. If the NLU results data includes a single NLU hypothesis, the NLU component 460 and the orchestrator component 430 may direct the NLU results data to the skill component(s) 490 associated with the NLU hypothesis. If the NLU results data includes an N-best list of NLU hypotheses, the NLU component 460 and the orches-
trator component 430 may direct the top scoring NLU hypothesis to a skill component(s) 490 associated with the top scoring NLU hypothesis. The system may also include a post-NLU ranker which may incorporate other information to rank potential interpretations determined by the NLU component 460. The local user device 110 may also include its own post-NLU ranker.

A skill component may be software running on the system component(s) 120 that is akin to a software application. That is, a skill component 490 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 490. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 490 may operate in conjunction between the system component(s) 120 and other devices, such as the user device 110, in order to complete certain functions. Inputs to a skill component 490 may come from speech processing interactions or through other interactions or input sources. A skill component 490 may include hardware, software, firmware, or the like that may be dedicated to a particular skill component 490 or shared among different skill components 490.

A skill system component(s) 125 may communicate with a skill component(s) 490 within the system component(s) 120 and/or directly with the orchestrator component 430 or with other components. A skill system component(s) 125 may be configured to perform one or more actions. An ability to perform such action(s) may sometimes be referred to as a "skill." That is, a skill may enable a skill system component(s) 125 to execute specific functionality in order to provide data or perform some other action requested by a user. For example, a weather service skill may enable a skill system component(s) 125 to provide weather information to the system component(s) 120, a car service skill may enable a skill system component(s) 125 to book a trip with respect to a taxi or ride sharing service, an order pizza skill may enable a skill system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system component(s) 120 may be configured with a skill component 490 dedicated to interacting with the skill system component(s) 125. Unless expressly stated otherwise, reference to a skill, skill device, or skill component may include a skill component 490 operated by the system component(s) 120 and/or skill operated by the skill system component(s) 125. Moreover, the functionality described herein as a skill or skill may be referred to using many different terms, such as an action, bot, app, or the like. The skill component 490 and or skill system component(s) 125 may return output data to the orchestrator component 430.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) 120 includes a language output component 493. The language output component 493 includes a natural language generation (NLG) component 479 and a text-to-speech (TTS) component 480. The NLG component 479 can generate text for purposes of TTS output to a user. For example, the NLG component 479 may generate text corresponding to instructions corresponding to a particular action for the user to perform. The NLG component 479 may generate appropriate text for various outputs as described herein. The NLG component 479 may include one or more trained models configured to output text appropriate for a particular input. The text output by the NLG component 479 may become input for the TTS component 480 (e.g., output text data discussed below). Alternatively or in addition, the TTS component 480 may receive text data from a skill component 490 or other system component for output.

The NLG component 479 may include a trained model. The NLG component 479 generates text data from dialog data such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the TTS component 480.

The TTS component 480 may generate audio data (e.g., synthesized speech) from text data using one or more different methods. Text data input to the TTS component 480 may come from a skill component 490, the orchestrator component 430, or another component of the system. In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 105 to request capture of image or video data. The user device 110 may process the commands locally or send audio data 411 representing the commands to the system component(s) 120 for processing, after which the system component(s) 120 may return output data that can cause the user device 110 to engage its camera.

Upon receipt by the system component(s) 120, the image data 421 may be sent to an orchestrator component 430. The orchestrator component 430 may send the image data 421 to an image processing component. The image processing component can perform computer vision functions such as object recognition, modeling, reconstruction, etc. For example, the image processing component may detect a person, face, etc. (which may then be identified using user recognition component). The device may also include an image processing component.

In some implementations, the image processing component can detect the presence of text in an image. In such implementations, the image processing component can recognize the presence of text, convert the image data to text data, and send the resulting text data via the orchestrator component 430 to the language processing component 492 for processing by the NLU component 460.

The system component(s) 120 may include a user recognition component that recognizes one or more users using a variety of data. However, the disclosure is not limited thereto, and the user device 110 may include a user recognition component instead of and/or in addition to user recognition component of the system component(s) 120 without departing from the disclosure. User recognition component operates similarly to user recognition component.

The user recognition component may take as input the audio data 411 and/or text data output by the ASR component 450. The user recognition component may perform user recognition by comparing audio characteristics in the audio data 411 to stored audio characteristics of users. The user recognition component may also perform user recognition by comparing biometric data (e.g., fingerprint data, iris data, etc.), received by the system in correlation with the present user input, to stored biometric data of users assuming user permission and previous authorization. The user recognition component may further perform user recognition by comparing image data (e.g., including a representation of at least a feature of a user), received by the system in correlation with the present user input, with stored image data including representations of features of different users. The user recognition component may perform additional user recognition processes, including those known in the art.

The user recognition component determines scores indicating whether user input originated from a particular user. For example, a first score may indicate a likelihood that the user input originated from a first user, a second score may indicate a likelihood that the user input originated from a second user, etc. The user recognition component also determines an overall confidence regarding the accuracy of user recognition operations.

Output of the user recognition component may include a single user identifier corresponding to the most likely user that originated the user input. Alternatively, output of the user recognition component may include an N-best list of user identifiers with respective scores indicating likelihoods of respective users originating the user input. The output of the user recognition component may be used to inform NLU processing as well as processing performed by other components of the system.

The system component(s) 120/user device 110 may include a presence detection component 494/594 that determines the presence and/or location of one or more users using a variety of data.

The system 100 (either on user device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component that may be configured to detect a sentiment of a user from audio data representing speech/utterances from the user, image data representing an image of the user, and/or the like. The sentiment detection component may be included in system component(s) 120, although the disclosure is not limited thereto and the sentiment detection component may be included in other components without departing from the disclosure. For example the sentiment detection component may be included in the user device 110, as a separate component, etc. The system component(s) 120 may use the sentiment detection component to, for example, customize a response for a user based on an indication that the user is happy or frustrated.

Figure 5:
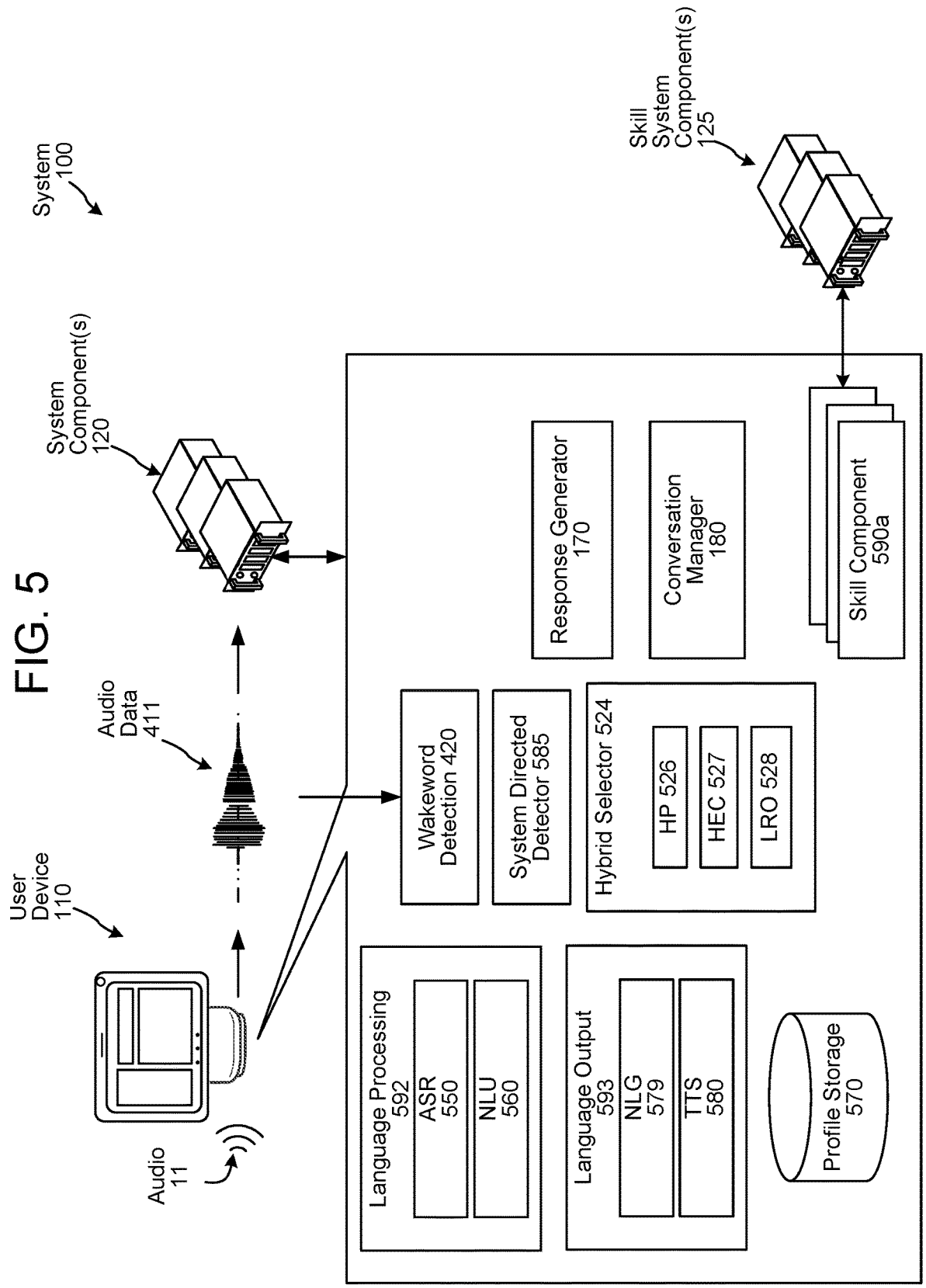
FIG. 5 is a conceptual diagram illustrating components that may be included in a device, according to embodiments of the present disclosure.

Although the components of FIG. 4 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 5 illustrates such a configured user device 110.

In at least some embodiments, the system component(s) 120 may receive the audio data 411 from the user device 110, to recognize speech corresponding to a spoken input in the received audio data 411, and to perform functions in response to the recognized speech. In at least some embodiments, these functions involve sending directives (e.g., commands), from the system component(s) 120 to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) 120 over the network(s) 199, some or all of the functions capable of being performed by the system component(s) 120 may be performed by sending one or more directives over the network(s) 199 to the user device 110, which, in turn, may process the directive(s) and perform one or more corresponding actions. For example, the system component(s) 120, using a remote directive that is included in response data (e.g., a remote response), may instruct the user device 110 to output an audible response (e.g., using TTS processing performed by an on-device TTS component 580) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 4, the user device 110 may include a wakeword detection component 420 configured to compare the audio data 411 to stored models used to detect a wakeword (e.g., "Alexa") that indicates to the user device 110 that the audio data 411 is to be processed for determining NLU output data (e.g., slot data that corresponds to a named entity, label data, and/or intent data, etc.). In at least some embodiments, a hybrid selector 524, of the user device 110, may send the audio data 411 to the wakeword detection component 420. If the wakeword detection component 420 detects a wakeword in the audio data 411, the wakeword detection component 420 may send an indication of such detection to the hybrid selector 524. In response to receiving the indication, the hybrid selector 524 may send the audio data 411 to the system component(s) 120 and/or the ASR component 550. The wakeword detection component 420 may also send an indication, to the hybrid selector 524, representing a wakeword was not detected. In response to receiving such an indication, the hybrid selector 524 may refrain from sending the audio data 411 to the system component(s) 120, and may prevent the ASR component 550 from further processing the audio data 411. In this situation, the audio data 411 can be discarded.

The user device 110 may conduct its own speech processing using on-device language processing components, such as an SLU/language processing component 592 (which may include an ASR component 550 and an NLU component 560), similar to the manner discussed herein with respect to the SLU component 492 (or ASR component 450 and the NLU component 460) of the system component(s) 120. Language processing component 592 may operate similarly to language processing component 492, ASR component 550 may operate similarly to ASR component 450 and NLU component 560 may operate similarly to NLU component 460. The user device 110 may also internally include, or otherwise have access to, other components such as one or more skill components 590 capable of executing commands based on NLU output data or other results determined by the user device 110/system component(s) 120 (which may operate similarly to skill components 490), a user recognition component (configured to process in a similar manner to that discussed herein with respect to the user recognition component of the system component(s) 120), profile storage 570 (configured to store similar profile data to that discussed herein with respect to the profile storage 470 of the system component(s) 120), or other components. In at least some embodiments, the profile storage 570 may only store profile data for a user or group of users specifically associated with the user device 110. Similar to as described above with respect to skill component 490, a skill component 590 may communicate with a skill system component(s) 125. The user device 110 may also have its own language output component 593 which may include NLG component 579 and TTS component 580. Language output component 593 may operate similarly to language output component 493, NLG component 579 may operate similarly to NLG component 479 and TTS component 580 may operate similarly to TTS component 480.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s) 120.

The hybrid selector 524, of the user device 110, may include a hybrid proxy (HP) 526 configured to proxy traffic to/from the system component(s) 120. For example, the HP 526 may be configured to send messages to/from a hybrid execution controller (HEC) 527 of the hybrid selector 524. For example, command/directive data received from the system component(s) 120 can be sent to the HEC 527 using the HP 526. The HP 526 may also be configured to allow the audio data 411 to pass to the system component(s) 120 while also receiving (e.g., intercepting) this audio data 411 and sending the audio data 411 to the HEC 527.

In at least some embodiments, the hybrid selector 524 may further include a local request orchestrator (LRO) 528 configured to notify the ASR component 550 about the availability of new audio data 411 that represents user speech, and to otherwise initiate the operations of local language processing when new audio data 411 becomes available. In general, the hybrid selector 524 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) 120 and chooses to use that remotely-determined directive data.

Thus, when the audio data 411 is received, the HP 526 may allow the audio data 411 to pass through to the system component(s) 120 and the HP 526 may also input the audio data 411 to the on-device ASR component 550 by routing the audio data 411 through the HEC 527 of the hybrid selector 524, whereby the LRO 528 notifies the ASR component 550 of the audio data 411. At this point, the hybrid selector 524 may wait for response data from either or both of the system component(s) 120 or the local language processing components. However, the disclosure is not limited thereto, and in some examples the hybrid selector 524 may send the audio data 411 only to the local ASR component 550 without departing from the disclosure. For example, the user device 110 may process the audio data 411 locally without sending the audio data 411 to the system component(s) 120.

The local ASR component 550 is configured to receive the audio data 411 from the hybrid selector 524, and to recognize speech in the audio data 411, and the local NLU component 560 is configured to determine a user intent from the recognized speech, and to determine how to act on the user intent by generating NLU output data which may include directive data (e.g., instructing a component to perform an action). Such NLU output data may take a form similar to that as determined by the NLU component 460 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 560) may be selected as usable to respond to a natural language user input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language user input, to use directive data received from the system component(s) 120, assuming a remote response is even received (e.g., when the user device 110 is able to access the system component(s) 120 over the network(s) 199), or to determine output audio requesting additional information from the user 105.

The user device 110 and/or the system component(s) 120 may associate a unique identifier with each natural language user input. The user device 110 may include the unique identifier when sending the audio data 411 to the system component(s) 120, and the response data from the system component(s) 120 may include the unique identifier to identify which natural language user input the response data corresponds.

In at least some embodiments, the user device 110 may include, or be configured to use, one or more skill components 590 that may work similarly to the skill component(s) 490 implemented by the system component(s) 120. The skill component(s) 590 may correspond to one or more domains that are used in order to determine how to act on a spoken input in a particular way, such as by outputting a directive that corresponds to the determined intent, and which can be processed to implement the desired operation. The skill component(s) 590 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 125. For example, a skill system component(s) 125 may be located in a remote environment (e.g., separate location) such that the user device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the user device 110 may communicate with the skill system component(s) 125 via a private network, such as a local area network (LAN).

As used herein, a "skill" may refer to a skill component 590, a skill system component(s) 125, or a combination of a skill component 590 and a corresponding skill system component(s) 125.

Similar to the manner discussed with regard to FIG. 4, the local user device 110 may be configured to recognize multiple different wakewords and/or perform different categories of tasks depending on the wakeword. Such different wakewords may invoke different processing components of local user device 110 (not illustrated in FIG. 5). For example, detection of the wakeword "Alexa" by the wakeword detection component 420 may result in sending audio data to certain language processing components 592/skill components 590 for processing while detection of the wakeword "Computer" by the wakeword detector may result in sending audio data different language processing components 592/skill components 590 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 6:
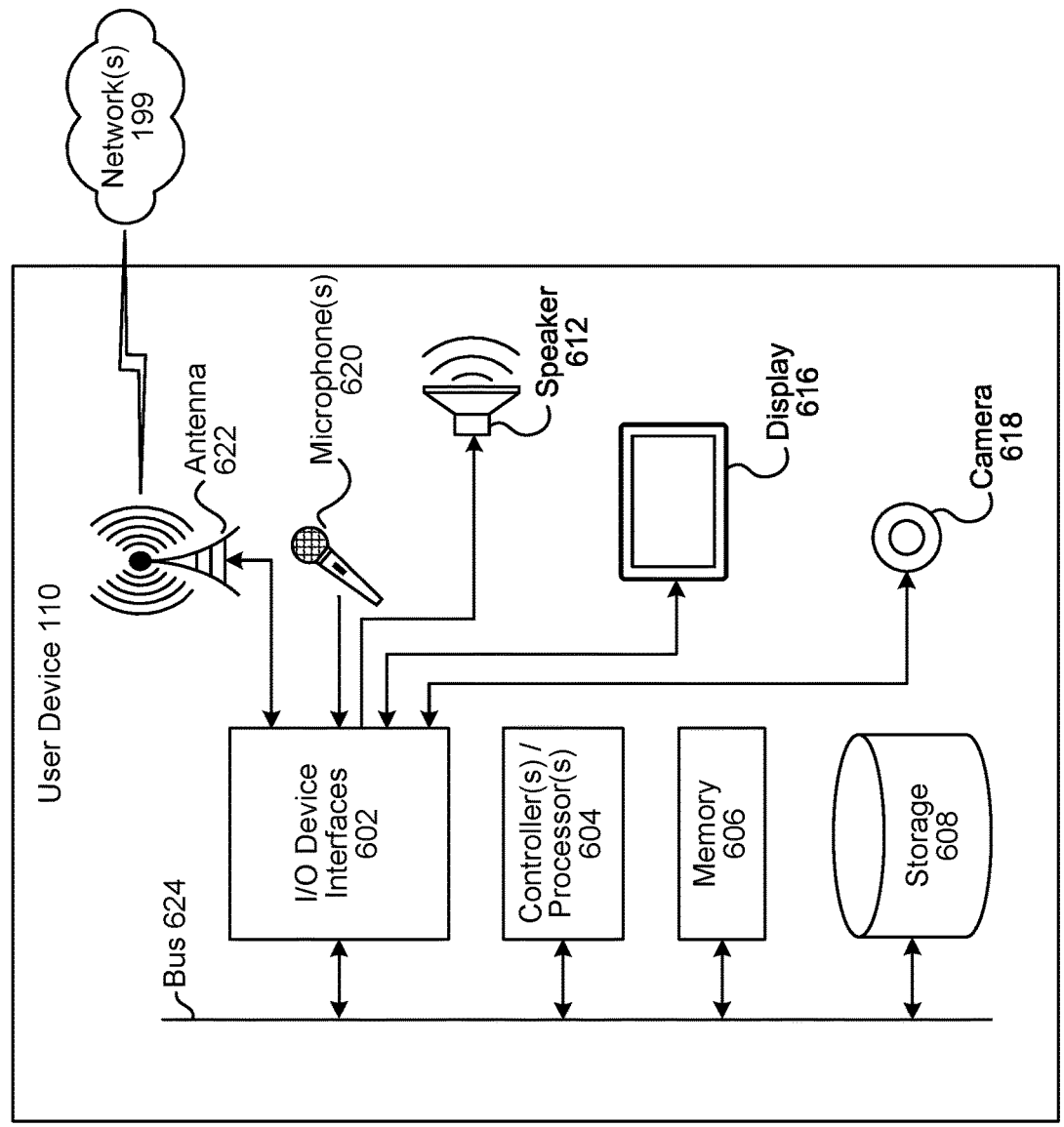
FIG. 6 is a block diagram conceptually illustrating example components of a device, according to embodiments of the present disclosure.
Figure 7:
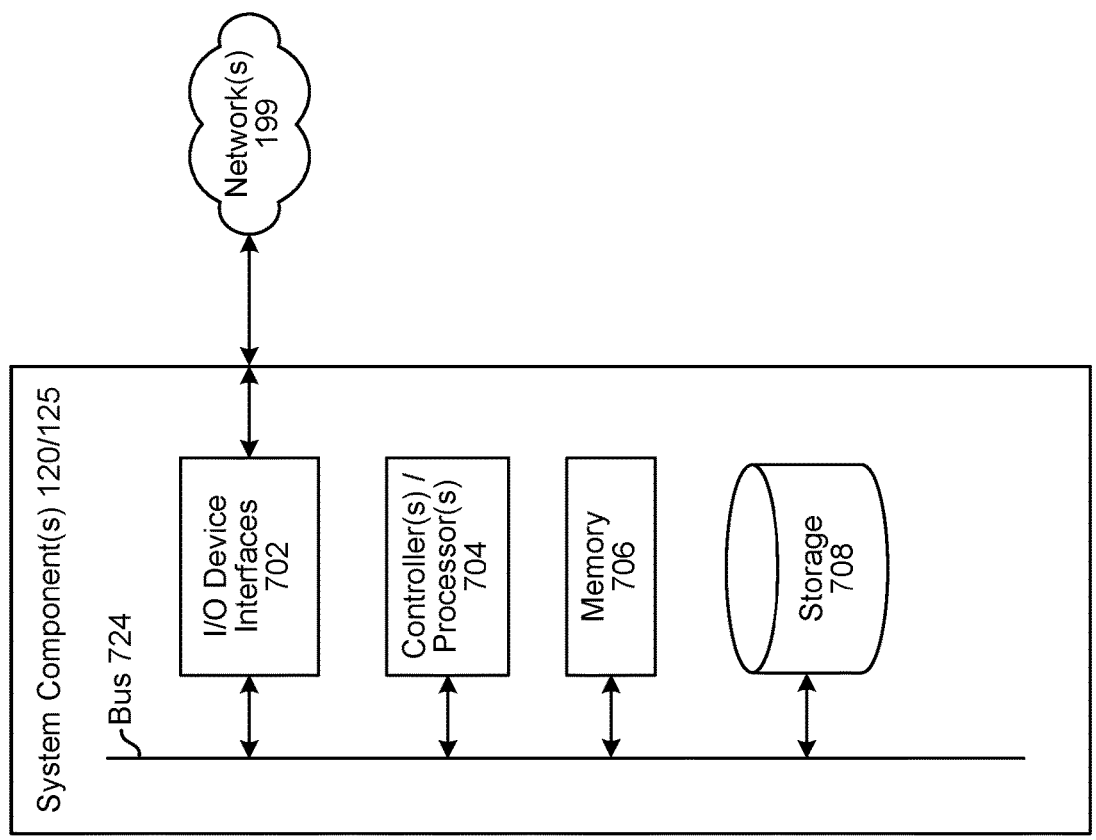
FIG. 7 is a block diagram conceptually illustrating example components of a system, according to embodiments of the present disclosure.

FIG. 6 is a block diagram conceptually illustrating a user device 110 that may be used with the system. FIG. 7 is a block diagram conceptually illustrating example components of a remote device, such as the natural language command processing system component(s) 120, which may assist with ASR processing, NLU processing, etc., and a skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) 120 may be located remotely from the user device 110 as its operations may not require proximity to the user. The server/system component(s) 120 may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) 120 being in a user's home/business is that data used to process a command/return a response may be kept within the user's home, thus reducing potential privacy concerns.

Multiple systems (120/125) may be included in the overall system 100 of the present disclosure, such as one or more natural language processing system component(s) 120 for performing ASR processing, one or more natural language processing system component(s) 120 for performing NLU processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120/125) may also include a data storage component (608/708) for storing data and controller/processor-executable instructions. Each data storage component (608/708) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (602/702).

Computer instructions for operating each device (110/120/125) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120/125) includes input/output device interfaces (602/702). A variety of components may be connected through the input/output device interfaces (602/702), as will be discussed further below. Additionally, each device (110/120/125) may include an address/data bus (624/724) for conveying data among components of the respective device. Each component within a device (110/120/125) may also be directly connected to other components in addition to (or instead of) being connected to other components across the bus (624/724).

Referring to FIG. 6, the user device 110 may include input/output device interfaces 602 that connect to a variety of components such as an audio output component such as a speaker 612, a wired headset or a wireless headset (not illustrated), or other component capable of outputting audio. The user device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 616 for displaying content. The user device 110 may further include a camera 618.

Via antenna(s) 622, the input/output device interfaces 602 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device(s) 110, the natural language command processing system component(s) 120, or a skill system component(s) 125 may include their own dedicated processors, memory, and/or storage. Alternatively, one or more of the components of the device(s) 110, the natural language command processing system component(s) 120, or a skill system component(s) 125 may utilize the I/O interfaces (602/702), processor(s) (604/704), memory (606/706), and/or storage (608/708) of the device(s) 110, natural language command processing system component(s) 120, or the skill system component(s) 125, respectively. Thus, the ASR component 450 may have its own I/O interface(s), processor(s), memory, and/or storage; the NLU component 460 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component(s) 120, and a skill system component(s) 125, as described herein, are illustrative, and may be located as a stand-alone device or may be included, in whole or in part, as a component of a larger device or system. As can be appreciated, a number of components may exist either on a system component(s) 120 and/or on user device 110. For example, language processing 492/592 (which may include ASR component 450/550), language output 493/593 (which may include NLG component 479/579 and TTS component 480/580), etc., for example as illustrated in FIGS. 4 and 5. Unless expressly noted otherwise, the system version of such components may operate similarly to the device version of such components and thus the description of one version (e.g., the system version or the local version) applies to the description of the other version (e.g., the local version or system version) and vice-versa.

Figure 8:
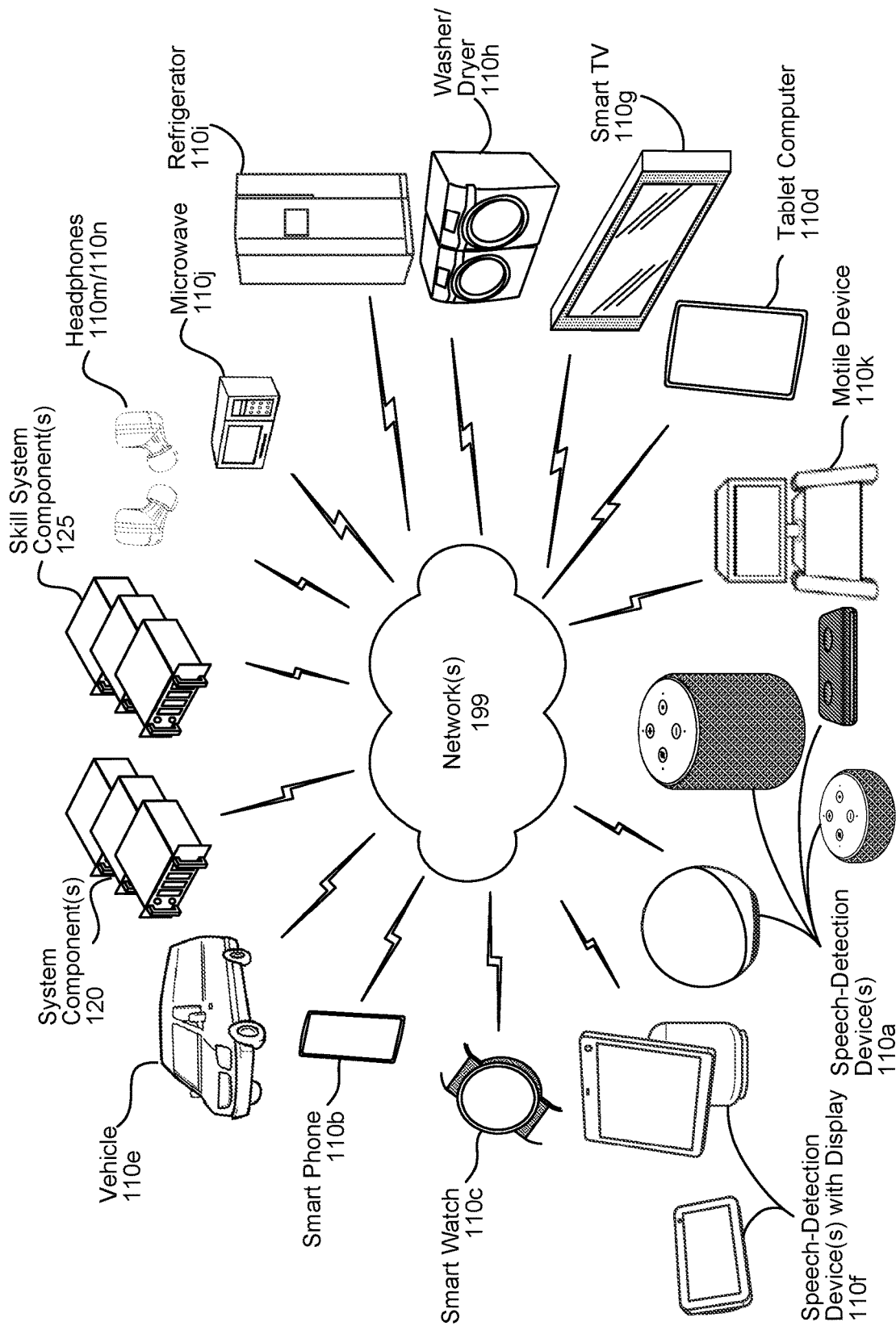
FIG. 8 illustrates an example of a computer network for use with the overall system, according to embodiments of the present disclosure.

As illustrated in FIG. 8, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile user device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, the NLU component 460, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving input audio data corresponding to a first spoken input of a dialog;
   determining dialog history data including:
      a first natural language representation of the first spoken input, and
      a second natural language representation of a previous spoken input of the dialog;
   based on the dialog history data, generating a first plurality of natural language questions corresponding to the dialog history data, the first plurality of natural language questions including a first natural language question and a second natural language question;
   after determining the first plurality of natural language questions, generating a first natural language answer responsive to the first natural language question;
   after determining the first plurality of natural language questions, generating a second natural language answer responsive to the second natural language question;
   based on the dialog history data, the first natural language question, the second natural language question, the first natural language answer, and the second natural language answer, determining:
      a first likelihood that the first natural language answer is responsive to the first natural language question, and
      a second likelihood that the second natural language answer is responsive to the second natural language answer;
   based on the first likelihood and the second likelihood, determining to generate first output data responsive to the first spoken input using the first natural language answer instead of the second natural language answer;
   using the dialog history data, the first natural language question, and the first natural language answer, generating the first output data; and
   causing presentation of the first output data.

2. The computer-implemented method of claim 1, wherein the first plurality of natural language questions further includes a third natural language question, and the method further comprises:
   processing, using a first trained machine learning (ML) component, the dialog history data to generate the first plurality of natural language questions;
   processing, using a second trained ML component:
      the dialog history data and the first natural language question to determine the first natural language question is semantically similar to the first natural language representation, and
      the dialog history data and the second natural language question to determine the second natural language question is semantically similar to the first natural language representation;
   based on determining the first natural language question is semantically similar to the first natural language representation and determining the second natural language question is semantically similar to the first natural language representation, determining a second plurality of natural language questions, the second plurality of natural language questions being a subset of the first plurality of natural language questions and including the first natural language question and the second natural language question; and
   processing, using a third trained ML component, the dialog history data and the second plurality of natural language questions to generate the first natural language answer and the second natural language answer.

3. The computer-implemented method of claim 1, further comprising:
   processing, using a first trained machine learning (ML) component, the dialog history data to generate the first plurality of natural language questions, wherein the first trained ML component is determined by:
      processing, using a second trained ML component, second dialog history data and a third natural language answer to generate a third natural language question,
      processing, using a third ML component, the second dialog history data to generate a fourth natural language question,
      determining a semantic similarity between the third natural language question and the fourth natural language question, and
      based on the semantic similarity, determining at least one parameter of the first trained ML component.

4. The computer-implemented method of claim 1, further comprising:
   retrieving, from a database and using the first natural language question, a document associated with at least a first entity included in the first natural language question;
   based at least in part on the document, determining the first natural language answer; and
   determining metadata corresponding to one or more natural language words included in the document, the one or more natural language words being associated with the first natural language answer,
   wherein:
      the first likelihood is determined further using the metadata, and
      the first output data is generated further using the metadata.

5. A computer-implemented method comprising:
   receiving first input data corresponding to a first natural language user input, wherein the first natural language user input is a declarative statement;
   generating, a first natural language question related to the first natural language user input;
   generating, a second natural language question related to the first natural language user input;
   generating a first natural language answer responsive to the first natural language question;
   generating a second natural language answer responsive to the second natural language question;
   generating first output data responsive to the first natural language user input, wherein the first output data is generated based on at least one of the first natural language answer and the second natural language answer; and
   causing presentation of the first output data.

6. The computer-implemented method of claim 5, further comprising:
   processing, using a first machine learning (ML) component, the first natural language user input to generate the first natural language question;
   processing, using the first ML component, the first natural language user input to generate the second natural language question;
   processing, using a second ML component:
      the first natural language user input and the first natural language question to determine the first natural language question is semantically similar to the first natural language user input, and
the first natural language user input and the second natural language question to determine the second natural language question is semantically similar to the first natural language user input;
processing, using a third ML component:
the first natural language user input and the first natural language question to generate the first natural language answer, and
the first natural language user input and the second natural language question to generate the second natural language answer; and
processing, using a fourth ML component, the first natural language user input, the first natural language question, the second natural language question, the first natural language answer, and the second natural language answer to determine:
a first likelihood that that the first natural language answer is responsive to the first natural language question, and
a second likelihood that the second natural language answer is responsive to the second natural language question,
wherein the first output data is generated based on the first natural language answer instead of the second natural language answer based on the first likelihood and the second likelihood.

7. The computer-implemented method of claim 5, wherein:
the first output data is determined based on the first natural language answer and the second natural language answer.

8. The computer-implemented method of claim 5, further comprising:
retrieving, from a database and using the first natural language question, a document associated with at least a first entity included in the first natural language question;
based at least in part on the document, determining the first natural language answer; and
determining metadata corresponding to one or more natural language words included in the document, the one or more natural language words being associated with the first natural language answer,
wherein:
the first output data is generated further using the metadata.

9. The computer-implemented method of claim 5, further comprising:
using a first machine learning (ML) component configured to generate a natural language question configured to elicit a declarative response, processing the first natural language user input to generate the first natural language question; and
using a second ML component configured to generate a natural language question based on the natural language question being associated with a plurality of user inputs, processing the first natural language user input to generate the second natural language question.

10. The computer-implemented method of claim 5, further comprising:
using a first machine learning (ML) component, processing the first natural language user input to generate the first natural language question; and using the first ML component, processing the first natural language user input to generate the second natural language question, wherein the first ML component is determined by:
processing, using a second ML component, dialog history data and a third natural language answer to generate a third natural language question,
processing, using a third ML component, the dialog history data to generate a fourth natural language question,
determining a similarity between the third natural language question and the third natural language question, and
based on the similarity, determining at least one parameter of the first ML component.

11. The computer-implemented method of claim 5, further comprising:
generating second output data responsive to the first natural language user input, wherein the second output data is generated based on the second natural language answer;
determining a first likelihood that presentation of the first output data will result in a first subsequent user input related to the first output data; and
determining a second likelihood that presentation of the second output data will result in a second subsequent user input related to the second output data,
wherein causing the presentation of the first output data is based on the first likelihood and the second likelihood.

12. The computer-implemented method of claim 5, further comprising:
processing the first natural language user input to determine at least a first entity included in the first natural language user input,
wherein the first natural language question and the second natural language question include the at least first entity.

13. A computing system comprising:
at least one processor, and
at least one memory comprising instructions that, when executed by the at least one processor, causes the computing system to:
receive first input data corresponding to a first natural language user input, wherein the first natural language user input is a declarative statement;
generate, a first natural language question related to the first natural language question;
generate a second natural language question related to the first natural language user input;
generate a first natural language answer responsive to the first natural language question;
generate a second natural language answer responsive to the second natural language question;
generate first output data responsive to the first natural language user input, wherein the first output data is generated based on at least one of the first natural language answer and the second natural language answer; and
cause presentation of the first output data.

14. The computing system of claim 13, wherein the at least one memory further comprises instructions that, when executed by the at least one processor, further cause the computing system to:
process, using a first machine learning (ML) component, the first natural language user input to generate the first natural language question;

process, using the first ML component, the first natural language user input to generate the second natural language question;

process, using a second ML component:
the first natural language user input and the first natural language question to determine the first natural language question is semantically similar to the first natural language user input, and
the first natural language user input and the second natural language question to determine the second natural language question is semantically similar to the first natural language user input;

process, using a third ML component configured to use a search engine to generate a natural language answer responsive to a natural language question:
the first natural language user input and the first natural language question to generate the first natural language answer, and
the first natural language user input and the second natural language question to generate the second natural language answer; and process, using a fourth ML component, the first natural language user input, the first natural language question, the second natural language question, the first natural language answer, and the second natural language answer to determine:
a first likelihood that that the first natural language answer is responsive to the first natural language question, and
a second likelihood that the second natural language answer is responsive to the second natural language question, wherein the first output data is generated using the first natural language answer instead of the second natural language answer based on the first likelihood and the second likelihood.

15. The computing system of claim 13, wherein:
the first output data is determined based on the first natural language answer and the second natural language question and the second natural language answer.

16. The computing system of claim 13, wherein the at least one memory further comprises instructions that, when executed by the at least one processor, further cause the computing system to:
retrieve, from a database and using the first natural language question, a document associated with at least a first entity included in the first natural language question;
based at least in part on the document, determining the first natural language answer; and
determining metadata corresponding to one or more natural language words included in the document, the one or more natural language words being contextually associated with the first natural language answer,
wherein:
the first output data is generated further using the metadata.

17. The computing system of claim 13, wherein the at least one memory further comprises instructions that, when executed by the at least one processor, further cause the computing system to:

using a first machine learning (ML) component configured to generate a natural language question configured to elicit a declarative response, process the first natural language user input to generate the first natural language question; and
using a second ML component configured to generate a natural language question based on the natural language question being associated with a plurality of user inputs, process the first natural language user input to generate the second natural language question.

18. The computing system of claim 13, wherein the at least one memory further comprises instructions that, when executed by the at least one processor, further cause the computing system to:
using a first machine learning (ML) component, process the first natural language user input to generate the first natural language question; and
using the first machine learning (ML) component, process the first natural language user input to generate the second natural language question, wherein the first ML component is determined by:
processing, using a second ML component, dialog history data and a third natural language answer to generate a third natural language question,
processing, using a third ML component, the dialog history data to generate a fourth natural language question,
determining a similarity between the third natural language question and the third natural language question, and
based on the similarity, determining at least one parameter of the first ML component.

19. The computing system of claim 13, wherein the at least one memory further comprises instructions that, when executed by the at least one processor, further cause the computing system to:
generate second output data responsive to the first natural language user input, the second output data being generated based on the second natural language answer;
determine a first likelihood that presentation of the first output data will result in a first subsequent user input related to the first output data; and
determine a second likelihood that presentation of the second output data will result in a second subsequent user input related to the second output data,
wherein causing the presentation of the first output data is based on the first likelihood and the second likelihood.

20. The computing system of claim 13, wherein the at least one memory further comprises instructions that, when executed by the at least one processor, further cause the computing system to:
process the first natural language user input to determine at least a first entity included in the first natural language user input,
wherein the first natural language question and the second natural language question includes the at least first entity.

* * * * *